US011059965B2

(12) United States Patent
Fischer et al.

(10) Patent No.: US 11,059,965 B2
(45) Date of Patent: Jul. 13, 2021

(54) PROCESS FOR PRODUCING ASA PLASTICS

(71) Applicant: INEOS STYROLUTION GROUP GMBH, Frankfurt am Main (DE)

(72) Inventors: Wolfgang Fischer, Walldorf (DE); Ulrich Jansen, Dormagen (DE); Tobias Schulz, Cologne (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 105 days.

(21) Appl. No.: 16/334,936

(22) PCT Filed: Sep. 25, 2017

(86) PCT No.: PCT/EP2017/074168
§ 371 (c)(1),
(2) Date: Mar. 20, 2019

(87) PCT Pub. No.: WO2018/060111
PCT Pub. Date: Apr. 5, 2018

(65) Prior Publication Data
US 2019/0264021 A1  Aug. 29, 2019

(30) Foreign Application Priority Data
Sep. 27, 2016 (EP) ..................................... 16190740

(51) Int. Cl.
*C08L 51/00* (2006.01)
*C08L 25/12* (2006.01)
*C08L 25/16* (2006.01)
*C08L 51/04* (2006.01)
*C08F 6/00* (2006.01)
*C08L 69/00* (2006.01)

(52) U.S. Cl.
CPC ............ *C08L 51/003* (2013.01); *C08F 6/005* (2013.01); *C08F 6/008* (2013.01); *C08L 25/12* (2013.01); *C08L 25/16* (2013.01); *C08L 51/04* (2013.01); *C08L 69/00* (2013.01); *C08L 2205/025* (2013.01); *C08L 2205/035* (2013.01)

(58) Field of Classification Search
CPC ................................. C08L 25/12; C08L 51/04
See application file for complete search history.

(56) References Cited

U.S. PATENT DOCUMENTS

| | | |
|---|---|---|
| 3,553,167 A | 1/1971 | Schnell et al. |
| 3,691,260 A | 9/1972 | Mittnacht et al. |
| 4,009,226 A | 2/1977 | Ott et al. |
| 4,075,173 A | 2/1978 | Maruyama et al. |
| 4,156,069 A | 5/1979 | Prevorsek et al. |
| 4,181,788 A | 1/1980 | Wingler et al. |
| 4,224,419 A | 9/1980 | Swoboda et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 4,605,699 A | 8/1986 | Mitulla et al. |
| 4,634,734 A | 1/1987 | Hambrecht et al. |
| 4,732,949 A | 3/1988 | Paul et al. |
| 4,772,743 A | 9/1988 | Schmidt et al. |
| 4,788,253 A | 11/1988 | Hambrecht et al. |
| 4,880,875 A | 11/1989 | Wassmuth et al. |
| 4,982,014 A | 1/1991 | Freitag et al. |
| 5,039,747 A * | 8/1991 | Piejko ..................... C08J 3/005 525/197 |
| 5,071,946 A | 12/1991 | Schmidt et al. |
| 5,080,845 A | 1/1992 | Herrmann et al. |
| 5,100,945 A | 3/1992 | Schmidt et al. |
| 5,910,276 A | 6/1999 | Guntherberg et al. |
| 5,958,316 A | 9/1999 | Guntherberg et al. |
| 5,994,463 A | 11/1999 | Eckel et al. |
| 6,140,426 A | 10/2000 | Sarabi et al. |

(Continued)

FOREIGN PATENT DOCUMENTS

| | | |
|---|---|---|
| CA | 1173998 A | 9/1984 |
| DE | 1260135 B | 2/1968 |

(Continued)

OTHER PUBLICATIONS

Gehrmann et al., Trocknungstechnik in der Lebensmittelindustrie, Behr's Verlag GmbH & Co.KG, 2009, Section 2.5.3 Statische Wirbelschichttrockner, pp. 143-145; see english translation of specification for relevancy at p. 4. lines 34-37.

Krischer et al., Trocknungstechnik, Zweiter Band, Trockner and Trocknungsverfahren von K. Kroll, Springer-Verlag, 1959, pp. 282 ff; see english translation of specification for relevancy at p. 4, lines 28-30 and line 41; p. 5, lines 1-2.

Scholtan et al., Bestimmung der Teilchengrobenverteilung von Latices mit der Ultrazentrifuge, Kolloid-Z. u. Z. Polymere 250, 1972, pp. 782-796; see english translation of specification for relevancy at p. 15, lines 30-31.

(Continued)

*Primary Examiner* — Jeffrey C Mullis
(74) *Attorney, Agent, or Firm* — J.A. Lindeman & Co. PLLC

(57) ABSTRACT

The invention relates to a process for producing thermoplastic molding materials based on acrylonitrile-styrene-acrylate copolymers (ASA) having improved surface properties, in particular an improved stability of surface quality during storage in a hot and humid environment and a reduced content of residual monomers. The invention further relates to the use of a fluidized bed dryer and/or a flow dryer in the production of thermoplastic ASA molding materials for improving surface quality and the use of a fluidized bed dryer and/or a flow dryer in the production of thermoplastic ASA molding materials for reducing the content of residual monomers. The invention further provides ASA molding materials producible by means of the process according to the invention and also moldings.

14 Claims, 2 Drawing Sheets

(56) References Cited

U.S. PATENT DOCUMENTS

Figure 1:
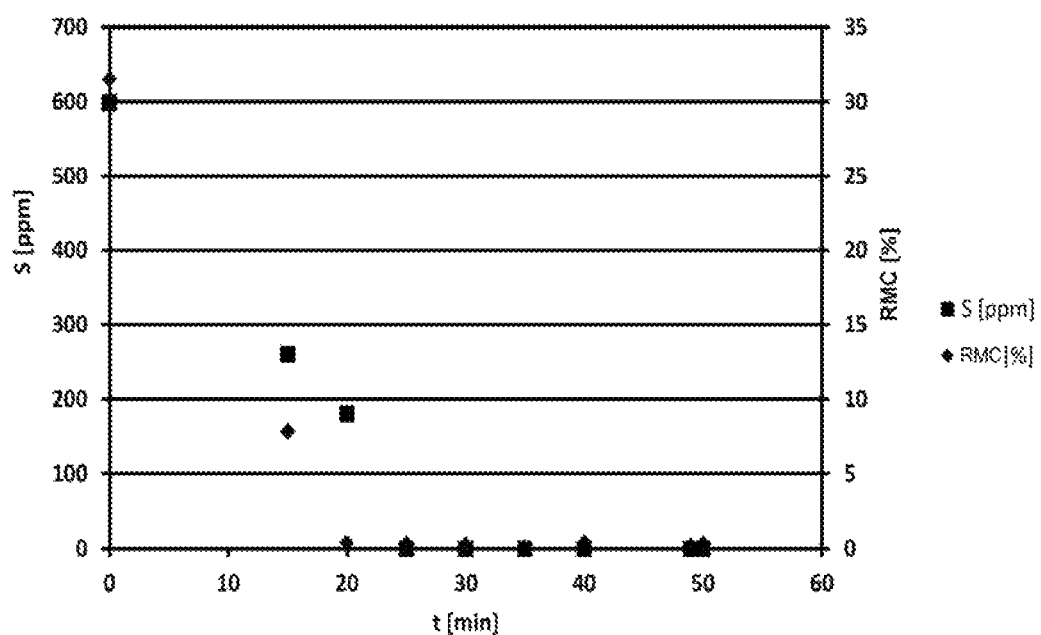

| | | | |
|---|---|---|---|
| 2003/0092836 A1 | 5/2003 | Eichenauer et al. | |
| 2003/0236350 A1 † | 12/2003 | Berzinis | |
| 2004/0132905 A1 | 7/2004 | Eichenauer et al. | |
| 2004/0255780 A1 | 12/2004 | Konig et al. | |
| 2008/0067137 A1* | 3/2008 | Banister | F26B 3/08 210/771 |
| 2008/0067711 A1 | 3/2008 | Schwemler et al. | |
| 2010/0210789 A1 | 8/2010 | Seidel et al. | |
| 2013/0281595 A1 | 10/2013 | Seidel et al. | |
| 2015/0065623 A1 | 3/2015 | Seidel et al. | |
| 2016/0033470 A1* | 2/2016 | Reed | C08F 2/001 526/61 |
| 2016/0152813 A1* | 6/2016 | Niessner | B29C 48/67 525/86 |
| 2016/0297957 A1 | 10/2016 | Boeckmann et al. | |
| 2017/0145201 A1 | 5/2017 | Boeckmann et al. | |

FOREIGN PATENT DOCUMENTS

| | | |
|---|---|---|
| DE | 1911882 A1 | 9/1970 |
| DE | 1495626 B1 | 6/1971 |
| DE | 2232877 A1 | 1/1974 |
| DE | 2420358 A1 | 12/1975 |
| DE | 2703376 A1 | 8/1977 |
| DE | 2714544 A1 | 10/1977 |
| DE | 2724360 A1 | 12/1978 |
| DE | 2826925 A1 | 1/1980 |
| DE | 2842005 A1 | 4/1980 |
| DE | 3000610 A1 | 7/1980 |
| DE | 2940024 A1 | 4/1981 |
| DE | 3007934 A1 | 9/1981 |
| DE | 3149358 A1 | 6/1983 |
| DE | 3334782 A1 | 10/1984 |
| DE | 3414118 A1 | 10/1985 |
| DE | 3506472 A1 | 8/1986 |
| DE | 3615607 A1 | 11/1987 |
| DE | 3639904 A1 | 6/1988 |
| DE | 3832396 A1 | 2/1990 |
| DE | 3840293 A1 | 5/1990 |
| DE | 3913509 A1 | 10/1990 |
| DE | 19547975 A1 | 6/1997 |
| DE | 19713509 A1 | 10/1998 |
| DE | 10008420 A1 | 8/2001 |
| DE | 102007029010 A1 | 2/2008 |
| EP | 0111260 A1 | 6/1984 |
| EP | 0734825 A1 | 10/1996 |
| EP | 1415693 A1 | 5/2004 |
| EP | 1567596 B1 | 1/2008 |
| EP | 2606073 A1 | 6/2013 |
| GB | 1124911 A | 8/1968 |
| KR | 20070019411 A † | 2/2007 |
| WO | 2010094416 A1 | 8/2010 |
| WO | 2012022710 A1 | 2/2012 |
| WO | 2013160029 A1 | 10/2013 |
| WO | 2013160249 A1 | 10/2013 |
| WO | 2014122179 A1 | 8/2014 |
| WO | 2015078751 A1 | 6/2015 |
| WO | 2015150223 A1 | 10/2015 |

OTHER PUBLICATIONS

Wohlleben et al., Measurement of Particle Size Distribution of Polymer Latexes, PSD from hydrodynamic chromatography and comparison with other analytical techniques, 2010, pp. 130-153, Kerala, India.

Yongchun et al., Explosion Risk Management of ABS Powder Process, Proceedings of the 8th International Conference on Measurement and Control of Granular Materials (MCGM), 2009.

English translation of International Preliminary Report on Patentability in International Application No. PCT/EP2017/074168, dated Mar. 28, 2019.

\* cited by examiner
† cited by third party

PROCESS FOR PRODUCING ASA PLASTICS

The invention relates to a process for the production of thermoplastic molding compositions based on acrylonitrile-styrene-acrylate copolymers (ASA) with improved surface properties, in particular improved stability of surface quality during storage in a moist, warm environment. The molding compositions produced in the invention moreover in particular have reduced content of residual monomers. The invention further relates to the use of a fluidized-bed dryer and/or pneumatic dryer in the production of thermoplastic ASA molding compositions, in order to improve surface quality. The invention further relates to the use of a fluidized-bed dryer and/or pneumatic dryer in the production of thermoplastic ASA molding compositions in order to reduce the content of residual monomers. The invention likewise provides ASA molding compositions which can be produced by means of the process of the invention, and also moldings (e.g. molded bodies, films and coatings) produced from the thermoplastic molding compositions.

It is known that styrene-acrylonitrile copolymers (SAN) or methylstyrene-acrylonitrile copolymers (e.g. alpha-methylstyrene-acrylonitrile copolymers, AMSAN) can be modified via incorporation of graft rubbers, for example crosslinked polyacrylate rubbers, to obtain better impact resistance. These acrylonitrile-styrene-acrylate copolymers (ASA) have been used for many years in large quantities as thermoplastic molding compositions for the production of all types of moldings. Possible production methods for these impact-modified SAN molding compositions are in principle graft polymerization of styrene and acrylonitrile in the presence of a graft rubber and/or subsequent blending of a graft rubber (graft latex) with a separately produced polymeric styrene-acrylonitrile matrix. The property profile of the molding compositions, and of the moldings produced therefrom, can be varied widely here. Examples of ASA copolymers obtainable commercially are products in the Luran® S line (from Ineos Styrolution, Frankfurt). There are also blends of ASA and polycarbonate (ASA/PC) obtainable by way of example as Luran® SC (Ineos Styrolution). Blends of ASA and polyamide (ASA/PA) are obtainable by way of example as Terblend® S (Ineos Styrolution).

It is usual to establish a specific median particle size of the graft rubber, because the size of the rubber particles has a significant effect on the physical properties of the subsequent thermoplastic molding composition.

This is described by way of example in WO 2015/078751. After the graft polymerization procedures, the graft copolymer (graft rubber) is often precipitated via addition of a salt solution and/or acid solution as coagulant, and washed and dried. The document EP-A 0 734 825 describes the dewatering and drying of ASA graft copolymers in an extruder.

Properties of particular importance in ASA molding compositions, alongside their advantageous mechanical properties such as high toughness (impact resistance, notched impact resistance), high elasticity (modulus of elasticity), good processability (thermoplastic flowability, in particular an appropriate melt flow index, MVR) and high heat resistance, are in particular surface properties such as gloss, smoothness, homogeneity, and uniform appearance. In particular, ASA molding compositions and the moldings produced therefrom are intended to have high surface homogeneity, i.e. a surface without defects such as depressions, cracks or salt inclusions. A very significant requirement for particular application sectors in this connection is retention of surface homogeneity under moist, warm environmental conditions. The expression "moist, warm environment" generally means conditions comprising a temperature and a humidity which are higher than the usual values of from 15 to 25° C. and from 30 to 60%. Moist, warm environmental conditions can moreover in particular comprise direct contact of the relevant surface with liquid water, e.g. condensation.

Salt inclusions resulting from a production process and present in an ASA molding composition or in the molding produced therefrom often impair surface quality, and this in particular becomes apparent after the molding composition has been extruded. Under moist, warm environmental conditions, the salt inclusions moreover absorb moisture and become enlarged, and in some circumstances may break up into smaller particles. This results in surface defects (specks), for example white spots, depressions (cavities) and/or cracks, leading to impairment of surface quality, in particular of surface homogeneity.

Although the ASA molding compositions described in the prior art have good mechanical properties and good processability, the surface homogeneity of the molding compositions typically suffers impairment under moist, warm environmental conditions.

The salt inclusions in ASA molding compositions generally result from salts and acids used during the production of ASA molding compositions, in particular from the salts and acids used as coagulants during the precipitation of the graft copolymer, examples being alkali metal salts, alkaline earth metal salts and aluminum salts, often chlorides, sulfates, nitrates, phosphates, acetates, formates, aluminates and/or carbonates. Removal of this salt loading in downstream washing and purification steps is often complicated and possible only with high consumption of energy and/or of water.

Another possibility for avoiding the disadvantageous formation of surface defects (specks) consists in re-extrusion of the molding composition after storage under moist, warm conditions; this incurs high additional technical cost.

The documents EP-A 1567596, WO 2013/160029 and WO 2013/160249 describe rubber-containing polymer compositions and processes for production thereof, the intention here being to select the rubber-precipitation conditions in a manner that gives compositions with improved surface after storage under warm, moist conditions.

It is moreover desirable to obtain ASA molding compositions with minimized content of residual monomers, in particular of acrylonitrile and/or styrene. The prior art describes various processes intended to reduce the content of monomers in the polymer. The document DE-A 10 2007 029 010 describes a process for the compounding of two polymers, for example ABS and PC, with use of an extruder with vent zones, using an inert entrainer. The document DE-A 38 40 293 describes a process for the removal of low-molecular-weight compounds from polymers where an inert extraction gas is mixed with the polymer in an extruder. The document WO 2010/094416 is directed to a process for the production of a polymer composition, e.g. PC/ABS blend, with reduced content of volatile compounds where the polymers, which have a certain water content, are melted in an extruder with a specific vent zone. EPA 1415693 describes a process in which a mixture of polymer, residual monomers, oligomers and solvent is extruded through a plurality of dies into a devolatilizing container.

The processes described in the prior art for reducing content of residual monomers often disadvantageously require high apparatus cost, use of an extraction gas, and remelting of the polymer after production.

There is a major requirement for provision of a simple and inexpensive production process for ASA molding compositions where the resultant molding compositions have not only the known good mechanical properties but also improved surface quality, preferably improved stability of surface homogeneity in relation to a moist, warm environment. The intention is moreover to reduce the content of residual monomers in the ASA graft copolymer and thus in the ASA molding composition, without any need for an additional extruder step requiring complicated apparatus. In particular, the intention is to reduce the total content of residual monomers in the ASA graft copolymer to a value below 200 ppm, preferably below 100 ppm, based in each case on the dry ASA graft copolymer.

Surprisingly, it has been found that particularly advantageous ASA molding compositions are obtained if the drying of the ASA graft copolymer (graft rubber), in particular after precipitation, takes place in a fluidized-bed dryer or a pneumatic dryer (also termed flash dryer), or uses a combination of a fluidized-bed dryer with a pneumatic dryer. In particular, it has been found that rapid and uniform drying—as can be achieved in a fluidized-bed dryer or pneumatic dryer with suitable temperatures and residence times—has an advantageous effect on the surface quality of the ASA molding compositions and of moldings produced therefrom. The process of the invention can surprisingly provide a simple manner of obtaining, in particular, ASA molding compositions with minimized number of, and/or minimized dimensions, of salt inclusions.

Surprisingly, it has moreover been found that the drying described for the graft copolymer can significantly reduce the content of residual monomers, in particular the content of acrylonitrile and/or styrene. The ASA molding compositions produced by means of the process of the invention therefore feature a very low content of residual monomers, without any need for an additional extrusion and devolatilization step. In particular, it is possible to obtain ASA graft copolymers with total content of residual monomers below 200 ppm, in particular below 100 ppm, based in each case on the ASA graft copolymer.

In particular, it has been found that the content of residual monomer can be significantly reduced if the graft copolymer (graft latex) is further dried for from 5 to 30 min after water content of 2% by weight has been reached, in particular after water content of 1% by weight has been reached. In particular here, there is no disadvantageous effect on the other properties, for example mechanical properties, of the ASA molding compositions.

Fluidized-bed dryers are devices which are operated batchwise or continuously, in particular continuously. Fluidized-bed dryers are described by way of example in Krischer/Kroll, Trocknungstechnik [Drying technology] (Zweiter Band, Trockner und Trocknungsverfahren [Second volume, Dryers and drying processes], Springer-Verlag, 1959, pp. 275-282). Use of fluidized-bed dryers having one or more heat exchangers integrated into the fluidized bed is moreover known. Use of heat exchangers can in particular introduce the required drying energy into the fluidized bed. These fluidized-bed dryers are described by way of example in D. Gehrmann, et al., Trocknungstechnik in der Lebensmittelindustrie [Drying technology in the food industry] (Behr's Verlag GmbH & Co. KG, $1^{st}$ edn. 2009, Abschnitt 2.5.3 Statische Wirbelschichttrockner [Static fluidized-bed dryers], pages 143-145).

Pneumatic dryers or flash dryers are devices which in particular are operated continuously. They are described by way of example in Krischer/Kroll, Trocknungstechnik [Drying technology] (Zweiter Band, Trockner und Trocknungsverfahren [Second volume, Dryers and drying processes] by K. Kroll, Springer-Verlag, 1959, pp. 282 ff). The publication by Yongchun Z. et al. ("Explosion Risk Management of ABS Powder Processes", Proceedings of the 8th International Conference on Measurement and Control of Granular Materials (MCGM), 2009) describes the safety problems associated with drying of ABS in fluidized-bed dryers.

The invention provides a process for the production of a thermoplastic molding composition comprising (or consisting of):

A: from 5 to 90% by weight, preferably from 40 to 90% by weight, with particular preference from 50 to 90% by weight, of at least one thermoplastic copolymer A, produced from:

A1: from 50 to 95% by weight, preferably from 60 to 90% by weight, particularly preferably from 60 to 85% by weight, based on the copolymer A, of a monomer A1 selected from styrene, α-methylstyrene and mixtures of styrene with at least one other monomer selected from α-methylstyrene, p-methylstyrene and $C_1$-$C_8$-alkyl (meth)acrylate (preferably $C_1$-$C_4$-alkyl (meth)acrylate, e.g. methyl methacrylate or ethyl methacrylate), A2: from 5 to 50% by weight, preferably from 10 to 40% by weight, particularly preferably from 15 to 40% by weight, based on the copolymer A, of a monomer A2 selected from acrylonitrile and mixtures of acrylonitrile with at least one other monomer selected from methacrylonitrile, acrylamide, vinyl methyl ether, anhydrides of unsaturated carboxylic acids (e.g. maleic anhydride, phthalic anhydride), and imides of unsaturated carboxylic acids (e.g. N-substituted maleimides, for example N-cyclohexylmaleimide and N-phenylmaleimide), B: from 5 to 70% by weight, preferably from 10 to 60% by weight, particularly preferably from 10 to 50% by weight, of at least one graft copolymer B comprising:

B1: from 50 to 90% by weight, preferably from 55 to 90% by weight, particularly preferably from 55 to 65% by weight, based on the graft copolymer B, of at least one graft base B1 which is obtained via emulsion polymerization of:

B11: from 70 to 99.9% by weight, preferably from 87 to 99.5% by weight, based on the graft base B1, of at least one $C_1$-$C_8$-alkyl (meth)acrylate, preferably n-butyl acrylate, as monomer B11;

B12: from 0.1 to 10% by weight, preferably from 0.1 to 5% by weight, with particular preference from 0.5 to 3% by weight, particularly preferably from 1 to 2.5% by weight, based on the graft base B1, of at least one polyfunctional crosslinking monomer B12, preferably selected from allyl (meth)acrylate, divinylbenzene, diallyl maleate, diallyl fumarate, diallyl phthalate, triallyl cyanurate, triallyl isocyanurate and dicyclopentadienyl acrylate (DCPA);

B13: from 0 to 29.5% by weight, preferably from 0 to 20% by weight, particularly preferably from 0 to 10% by weight, based on the graft base B1, of at least one other monomer B13 selected from styrene, α-methylstyrene, $C_1$-$C_4$-alkylstyrene, acrylonitrile, methacrylonitrile, isoprene, butadiene, chloroprene, methyl methacrylate, alkylene glycol di(meth)acrylate and vinyl methyl ether;

where the entirety of B11+B12+B13 provides precisely 100% by weight; and

B2: from 10 to 50% by weight, preferably from 10 to 45% by weight, particularly preferably from 35 to 45% by weight, based on the graft copolymer B, of at least one graft shell B2 which is obtained via emulsion polymerization, in the presence of the at least one graft base B1, of:

B21: from 50 to 100% by weight, preferably from 50 to 95% by weight, particularly preferably from 65 to 80% by weight, with particular preference from 75 to 80% by weight, based on the graft shell B2, of a monomer B21, selected from styrene, α-methylstyrene and mixtures of styrene with at least one other monomer selected from α-methylstyrene, p-methylstyrene and $C_1$-$C_4$-alkyl (meth)acrylate (e.g. methyl methacrylate, ethyl methacrylate); and B22: from 0 to 50% by weight, preferably from 5 to 50% by weight, particularly preferably from 20 to 35% by weight, with particular preference from 20 to 25% by weight, based on the graft shell B2, of a monomer B22 selected from acrylonitrile and mixtures of acrylonitrile with at least one other monomer selected from methacrylonitrile, acrylamide, vinyl methyl ether, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide);

where the entirety of graft base B1 and graft shell B2 provides precisely 100% by weight;
and C: from 0 to 90% by weight, preferably from 0 to 80% by weight, particularly preferably from 0 to 35% by weight, often from 0.1 to 5% by weight, of at least one other polymeric component C, and K: from 0 to 40% by weight, particularly preferably from 0 to 5% by weight, often from 0.1 to 5% by weight, of at least one other component K selected from additives and auxiliaries, comprising the steps of:

a) precipitation of the at least one graft copolymer B after the emulsion polymerization procedure via addition of a precipitation solution comprising at least one salt;
b) mechanical dewatering of the precipitated graft copolymer B, preferably by means of centrifugation and/or filtration, where a graft copolymer B with water content smaller than or equal to 50% by weight is obtained;
c) drying of the dewatered graft copolymer B with the use of a drying gas, where the graft copolymer B is moved within the drying gas and the temperature of the drying gas is in the range from 50 to 160° C.;
d) mixing of the thermoplastic copolymer A with the dried graft copolymer B and optionally the other polymeric component(s) C and optionally the other component(s) K.

A particular feature of the molding compositions obtained by means of the process of the invention is that after storage of the molding composition or of the moldings produced therefrom under moist, warm environmental conditions the number of surface defects present, in particular caused by salt inclusions ("salt specks") is significantly lower, or indeed zero.

It is particularly preferable that after storage under moist, warm environmental conditions the thermoplastic ASA molding compositions produced by the process of the invention, or moldings produced therefrom, have fewer than 15 surface defects on a surface measuring 150 cm², preferably fewer than 10, particularly preferably fewer than 5. There is no disadvantageous effect on the other properties of the ASA molding compositions obtained by the process of the invention, e.g. mechanical properties.

The invention moreover provides the use of a fluidized-bed dryer and/or of a pneumatic dryer (flash dryer) in the production of a thermoplastic ASA molding composition as described above for the drying of the graft copolymer B described in more detail below, in order to improve the surface quality of the thermoplastic ASA molding composition or of the molding produced therefrom. In particular, the inventive use provides improved surface quality where the surface of the thermoplastic molding composition or of the molding produced therefrom undergoes no disadvantageous change during storage under moist, warm environmental conditions.

For the purposes of the present invention, the expression "ASA molding compositions" means molding compositions comprising at least 10% by weight, preferably at least 70% by weight, particularly preferably at least 95% by weight, of the thermoplastic copolymer A and the graft copolymer B (in total) as described above. It is preferable that the ASA molding composition comprises exclusively the thermoplastic copolymer A and the graft copolymer B as polymeric components. For the purposes of the present invention, the expression "ASA molding compositions" also covers polymer blends comprising the thermoplastic copolymer A and the graft copolymer B as described above and at least one other polymeric component C, in particular a rubber-free thermoplastic resin not composed of vinyl monomers, for example a polycondensate, preferably selected from polycarbonates, polyester carbonates, polyesters and polyamides.

The term "(meth)acrylic", for example in the name (meth)acrylic acid or $C_1$-$C_8$-alkyl ester of (meth)acrylic acid, encompasses for the purposes of the present invention the corresponding acrylic and/or methacrylic compounds.

The present invention moreover provides thermoplastic molding compositions which can be produced by the process of the invention described below, and moldings produced from the molding composition of the invention.

Thermoplastic Copolymer A

It is preferable that the thermoplastic copolymer A is a rubber-free copolymer A.

In a preferred embodiment, monomer A1 is styrene or α-methylstyrene and monomer A2 is acrylonitrile. In an embodiment to which preference is further given, monomer A1 is a mixture of styrene and α-methylstyrene and monomer A2 is acrylonitrile. It is preferable that the monomer mixture A1 described comprises at least 10% by weight of styrene, based on all of the monomer A1, preferably at least 50% by weight, and particularly preferably at least 90% by weight.

With particular preference the thermoplastic copolymer A is produced from (or consists of):

from 50 to 95% by weight, preferably from 60 to 90% by weight, particularly preferably from 60 to 85% by weight, based on the copolymer A, of the monomer A1 selected from styrene, α-methylstyrene and mixtures of styrene with α-methylstyrene, and from 5 to 50% by weight, preferably from 10 to 40% by weight, particularly preferably from 15 to 40% by weight, based on the copolymer A, of a monomer A2 selected from acrylonitrile and mixtures of acrylonitrile with methacrylonitrile.

Particular preference is given to a thermoplastic copolymer A with a quantity less than or equal to 35% by weight of acrylonitrile, based on the entire copolymer A.

The average molar mass $M_w$ of the thermoplastic copolymer A is preferably in the range from 20 000 to 200 000 g/mol. The limiting viscosity [η] of the thermoplastic copolymer A is preferably in the range from 20 to 110 ml/g (measured in dimethylformamide at 25° C.). The viscosity number of the thermoplastic copolymer A (determined in accordance with DIN 53726) is preferably in the range from 50 to 100 cm³/g, preferably from 55 to 85 cm³/g.

Details of the production of the thermoplastic copolymers A are described by way of example in DE-A 24 20 358 and DE-A 27 24 360. DE-A 1 971 3509 also describes equally suitable thermoplastic copolymers A.

The thermoplastic copolymers can be produced either via purely thermal initiation or via addition of initiators, in particular of free-radical initiators, for example of peroxides. Suitable thermoplastic copolymers A can preferably be produced by bulk polymerization or solution polymerization.

Graft Copolymer B

The molding composition in the invention comprises at least one graft copolymer B, in particular an ASA graft rubber comprising from 50 to 90% by weight, preferably from 55 to 90% by weight, based on the graft copolymer B, of at least one graft base B1, and from 10 to 50% by weight, preferably from 10 to 45% by weight, based on the graft copolymer B, of at least one graft shell B2, preferably from one to three graft shells B2, where the entirety of graft base B1 and graft shell(s) B2 provides precisely 100% by weight.

In a preferred embodiment, the graft copolymer B comprises from 10 to 50% by weight, preferably from 20 to 50% by weight, particularly preferably from 25 to 45% by weight, based on the graft copolymer B, of at least one graft shell B2 which is obtained via emulsion polymerization of:

B21: from 50 to 95% by weight, preferably from 65 to 80% by weight, particularly preferably from 70 to 80% by weight, based on the graft shell B2, of a monomer B21, selected from styrene, α-methylstyrene and mixtures of styrene with at least one other monomer selected from α-methylstyrene, p-methylstyrene and $C_1$-$C_4$-alkyl (meth)acrylate (e.g. methyl methacrylate, ethyl methacrylate), preferably selected from styrene, α-methylstyrene and mixtures of styrene with α-methylstyrene or methyl methacrylate; and B22: from 5 to 50% by weight, preferably from 20 to 35% by weight, particularly preferably from 20 to 30% by weight, based on the graft shell B2, of a monomer B22 selected from acrylonitrile and mixtures of acrylonitrile with at least one other monomer selected from methacrylonitrile, acrylamide, vinyl methyl ether, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide), preferably selected from acrylonitrile and mixtures of acrylonitrile and methacrylonitrile;

where the entirety of B21+B22 provides precisely 100% by weight.

It is preferable that the graft copolymer B consists of the graft base B1 as described above, preferably made of a crosslinked polybutyl acrylate rubber, and of precisely one graft shell B2 which is obtained via emulsion polymerization of the monomers B21 and B22 as described, in particular of styrene and acrylonitrile, in the presence of the graft base B1 (single-stage graft shell B2). It is further preferable that the graft copolymer B consists of the graft base B1 as described above, preferably made of a crosslinked polybutyl acrylate rubber, and two graft shells B2' and B2", where B2' is obtained via emulsion polymerization of the monomer B21 as described, in particular of styrene, in the presence of the graft base B1, and where the graft shell B2" is obtained via subsequent emulsion polymerization of the monomers B21 and B22 as described, in particular of styrene and acrylonitrile, in the presence of the graft base B1 grafted with B2' (two-stage graft shell B2).

It is particularly preferable that the at least one graft base B1 is obtained via emulsion polymerization of:

B11: preferably from 87 to 99.5% by weight, based on the graft base B1, of at least one $C_4$-$C_8$-alkyl (meth)acrylate, with particular preference n-butyl acrylate and/or 2-ethylhexyl acrylate, particularly preferably exclusively n-butyl acrylate;

B12: from 0.5 to 5% by weight, preferably from 0.5 to 3% by weight, particularly preferably from 1 to 2.5% by weight, based on the graft base B1, of at least one polyfunctional crosslinking monomer B12; preferably selected from allyl (meth)acrylate, divinylbenzene, diallyl maleate, diallyl fumarate, diallyl phthalate, triallyl cyanurate, diallyl isocyanurate and dicyclopentadienyl acrylate (DCPA), with particular preference allyl (meth)acrylate and/or dicyclopentadienyl acrylate (DCPA);

B13: from 0 to 29.9% by weight, preferably from 0 to 10% by weight, particularly preferably from 0.5 to 10% by weight, based on the graft base B1, of at least one other copolymerizable, monoethylenically unsaturated monomer B13 selected from styrene, α-methylstyrene, $C_1$-$C_4$-alkylstyrene, acrylonitrile, methacrylonitrile, isoprene, butadiene, chloroprene, methyl methacrylate, alkylene glycol di(meth)acrylate and vinyl methyl ether;

where the entirety of B11+B12+B13 provides precisely 100% by weight.

The preferred moonomers B11 for the production of the graft base B1 are alkyl acrylate and/or alkyl methacrylate having from 1 to 8, preferably from 4 to 8, carbon atoms in the alkyl moiety. Preference is in particular given to the monomer B11 n-butyl acrylate and/or 2-ethylhexyl acrylate, particularly n-butyl acrylate. It is preferable to use the alkyl acrylates mentioned as sole monomers B11.

In order to obtain crosslinking of the $C_1$-$C_8$-alkyl (meth) acrylate monomers B11 and thus crosslinking of the graft base B1, the polymerization is carried out in the presence of from 0.1 to 10% by weight of a polyfunctional crosslinking monomer B12, preferably from 0.1 to 5% by weight, preferably from 0.5 to 3% by weight, preferably from 1 to 4% by weight, particularly preferably from 1 to 2.5% by weight. The monomer B12 is in particular one or more polyfunctional monomers which bring about crosslinking and which can be copolymerized with the other monomers, in particular B11 and B13. Suitable polyfunctional crosslinking monomers B12 comprise two or more, preferably two or three, with particular preference precisely two, ethylenic double bonds, which are preferably not 1,3-conjugated. Examples of suitable polyfunctional crosslinking monomers B12 are allyl (meth)acrylate, divinylbenzene and diallyl esters of dicarboxylic acids, for example diallyl maleate, diallyl fumarate and diallyl phthalate.

Another preferred polyfunctional crosslinking monomer B12 is the acrylic ester of tricyclodecenyl alcohol (dicyclopentadienyl acrylate, DCPA), as described in DE-A 1 260 135.

The polyfunctional crosslinking monomer B12 is in particular at least one monomer selected from allyl (meth) acrylate, divinylbenzene, diallyl maleate, diallyl fumarate, diallyl phthalate, triallyl cyanurate, triallyl isocyanurate and dicyclopentadienyl acrylate (DCPA), preferably selected from allyl (meth)acrylate, divinylbenzene, diallyl maleate, diallyl fumarate, diallyl phthalate and dicyclopentadienyl acrylate (DCPA), with particular preference selected from allyl (meth)acrylate and dicyclopentadienyl acrylate (DCPA).

In a preferred embodiment, monomer B12 used is from 1 to 2.5% by weight, preferably from 1.5 to 2.1% by weight, based on the graft base B1, of dicyclopentadienyl acrylate (DCPA) alone or in a mixture with another of the abovementioned monomers B12, in particular in a mixture with allyl (meth)acrylate.

The graft base B1 can moreover optionally comprise one or more copolymerizable monoethylenically unsaturated monomers B13 different from B11 and B12. By way of example, monomers B13 used can be selected from butadiene, isoprene, styrene, acrylonitrile, methyl methacrylate and vinyl methyl ether.

In a preferred embodiment, the at least one graft base B1 is obtained via emulsion polymerization of:
- B11: from 90 to 99.9% by weight, preferably from 97 to 99.5% by weight, based on the graft base B1, of at least one $C_1$-$C_8$-alkyl (meth)acrylate, preferably n-butyl acrylate,
- B12: from 0.1 to 10% by weight, preferably from 0.5 to 3% by weight, particularly preferably from 1 to 2.5% by weight, based on the graft base B1, of at least one polyfunctional crosslinking monomer B12 selected from allyl (meth)acrylate, divinylbenzene, diallyl maleate, diallyl fumarate, diallyl phthalate and dicyclopentadienyl acrylate (DCPA), with particular preference allyl (meth)acrylate and/or dicyclopentadienyl acrylate (DCPA);
- where the entirety of B11+B12 provides precisely 100% by weight.

The graft base B1 consisting of the monomers B11, B12 and optionally B13, and also production thereof, is known and described in the literature, e.g. in DE-A 28 26 925, DE-A 31 49 358 and DE-A 34 14 118.

The graft copolymerization for the production of graft shell B2 (for example B2' and B2") can advantageously be undertaken in the system also used for the emulsion polymerization to produce the graft base B1; other additives can be added here, for example emulsifier, buffer substances and initiator. The monomers of the graft shell, in particular the monomers B21 and B22, can be added to the reaction mixture all at once, batchwise in a plurality of stages, or preferably continuously during the polymerization. Addition of the monomers B21 and/or B22 in a plurality of stages typically gives a multilayer structure of the graft shell B.

Suitable emulsifiers, buffer substances and initiators are described in WO 2015/150223 and WO 2015/078751.

In a preferred embodiment, the graft copolymer B (single-stage graft shell B2) comprises:
- B1: from 50 to 70% by weight, preferably from 55 to 65% by weight, particularly preferably from 58 to 65% by weight, based on the graft copolymer B, of at least one graft base B1, as described above;
- B2: from 30 to 50% by weight, preferably from 35 to 45% by weight, particularly preferably from 35 to 42% by weight, based on the graft copolymer B, of at least one graft shell B2 which is obtained via emulsion polymerization, in the presence of the at least one graft base B1, of:
  - B21: from 50 to 95% by weight, preferably from 65 to 80% by weight, particularly preferably from 70 to 80% by weight, based on the graft shell B2, of a monomer B21, selected from styrene, α-methylstyrene and mixtures of styrene with at least one other monomer selected from α-methylstyrene, p-methylstyrene and $C_1$-$C_4$-alkyl (meth)acrylate (e.g. methyl methacrylate, ethyl methacrylate), preferably selected from styrene, α-methylstyrene and mixtures of styrene with α-methylstyrene or methyl methacrylate; and
  - B22: from 5 to 50% by weight, preferably from 20 to 35% by weight, particularly preferably from 20 to 30% by weight, based on the graft shell B2, of a monomer B22 selected from acrylonitrile and mixtures of acrylonitrile with at least one other monomer selected from methacrylonitrile, acrylamide, vinyl methyl ether, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide), preferably selected from acrylonitrile and mixtures of acrylonitrile and methacrylonitrile;
- where the entirety of graft base B1 and graft shell B2 provides precisely 100% by weight.

In a preferred embodiment, the graft copolymer B (two-stage graft shell made of B2' and B2") comprises:
- B1: from 50 to 70% by weight, preferably from 60 to 70% by weight, based on the graft copolymer B, of at least one graft base B1, as described above;
- B2': from 10 to 30% by weight, preferably from 10 to 20% by weight, particularly preferably from 10 to 15% by weight, based on the graft copolymer B, of at least one graft shell B2' which is obtained via emulsion polymerization, in the presence of the at least one graft base B1, of:
  - B21': 100% by weight, based on the graft shell B2', of a monomer B21' selected from styrene, α-methylstyrene and mixtures of styrene with at least one other monomer selected from α-methylstyrene, p-methylstyrene and $C_1$-$C_4$-alkyl (meth)acrylate (e.g. methyl methacrylate, ethyl methacrylate); and also
- B2": from 20 to 40% by weight, preferably from 20 to 30% by weight, particularly preferably from 25 to 30% by weight, based on the graft copolymer B, of at least one graft shell B2" which is obtained via emulsion polymerization, in the presence of the graft base B1 grafted with B2', of:
  - B21": from 50 to 95% by weight, preferably from 65 to 80% by weight, particularly preferably from 70 to 80% by weight, based on the graft shell B2", of a monomer B21" selected from styrene, α-methylstyrene and mixtures of styrene with at least one other monomer selected from α-methylstyrene, p-methylstyrene and $C_1$-$C_4$-alkyl (meth)acrylate (e.g. methyl methacrylate, ethyl methacrylate), preferably selected from styrene, α-methylstyrene and mixtures of styrene with α-methylstyrene or methyl methacrylate; and
  - B22": from 5 to 50% by weight, preferably from 20 to 35% by weight, particularly preferably from 20 to 30% by weight, based on the graft shell B2", of a monomer B22" selected from acrylonitrile and mixtures of acrylonitrile with at least one other monomer selected from methacrylonitrile, acrylamide, vinyl methyl ether, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide).

It is preferable that the monomers B21, B21' and B21" are styrene or mixtures of styrene and α-methylstyrene.

It is preferable that the monomers B22 and B22" are acrylonitrile or mixtures of acrylonitrile with at least one other monomer selected from methacrylonitrile, maleic anhydride, N-cyclohexylmaleimide and N-phenylmaleimide; they are particularly preferably acrylonitrile or mixtures of acrylonitrile with at least one other monomer selected from methacrylonitrile and maleic anhydride.

In a particularly preferred embodiment, the monomer B21, B21' and B21" is styrene and the monomer B22 and B22' is acrylonitrile.

In a preferred embodiment, the median particle diameter $d_{50}$ of the graft copolymer B (obtained in the form of graft latex) is in the range from 50 to 1000 nm, preferably from 90 to 700 nm. The diameter of latex particles can typically be established via known suitable measures during the production procedure. This is described inter alia in DE-A 28 26 925.

The median particle diameter $d_{50}$ can typically be determined by ultracentrifuge measurement (by way of example described in W. Scholtan, H. Lange, Kolloid-Z. u. Z. Polymere 250, pp. 782 to 796, 1972) or with the aid of hydrodynamic chromatography HDC (by way of example described in W. Wohlleben, H. Schuch, "Measurement of Particle Size Distribution of Polymer Latexes", 2010, ed.: L. Gugliotta, J. Vega, pp. 130-153). The median particle diameter $d_{50}$ states the value within the distribution curve at which 50% by volume of the particles (e.g. of the polyacrylate latex) are smaller, the other 50% by volume being larger, than the $d_{50}$ diameter. Correspondingly, by way of example, the $d_{90}$ value states the particle diameter which is greater than that of 90% by volume of all of the particles.

In a preferred embodiment, the process of the invention comprises the production of one or at least two different graft copolymers B-I and B-II where the graft copolymers B-I and B-II differ in their median particle diameter $d_{50}$.

In particular, the graft copolymer B comprises at least one of the graft copolymers B-I and B-II where the median particle diameter $d_{50}$ of graft copolymer B-I is in the range from 50 to 180 nm, preferably from 80 to 150 nm, particularly preferably from 90 to 100 nm (small-particle ASA rubber) and the median particle diameter $d_{50}$ of graft copolymer B-II is in the range from 200 to 800 nm, preferably from 300 to 700 nm, particularly preferably from 400 to 600 nm (large-particle ASA rubber).

It is desirable that the particle size distribution of the graft copolymer B-II (large-particle ASA rubber) is narrow, advantageously with a quotient $Q=(d_{90}-d_{10})/d_{50}$ smaller than 0.3, preferably smaller than 0.2.

Large-particle crosslinked $C_1$-$C_8$-alkyl (meth)acrylate polymers suitable as graft base B1-II can be obtained by the known processes for the production of large-particle dispersions, and advantageously by the seed latex method as described in DE 1 911 882 for the production of ASA polymers. This method typically uses a small-particle crosslinked acrylate latex (seed latex) with median particle diameter $d_{50}$ in the range from 50 to 180 nm, preferably below 120 nm, obtained via emulsion polymerization of $C_1$-$C_8$-alkyl (meth)acrylates with crosslinking monomers and optionally with other comonomers, and subjects this to further polymerization via addition of other monomers, emulsifier and optionally buffer substance. The conditions here (cf. Journal of Applied Polymer Science, vol. 9 (1965), pages 2929 to 2938) are typically set to permit only further growth of the seed latex particles present, while preventing formation of any new latex particles. An initiator is generally used. The particle size of the resultant graft copolymer B-II (large-particle rubber) can in particular be established in the desired manner by varying the quantitative ratio of seed latex to monomers.

The graft copolymer B-II is then preferably obtained via emulsion polymerization of styrene or alpha-methylstyrene and acrylonitrile in the presence of the previously produced large-particle graft base B1-II.

The graft copolymers B-I and B-II can moreover be used in combination during the production of the molding composition of the invention, in particular in step d) (mixing of components). The ratio by weight of the graft copolymer B-I and B-II can vary widely. It is preferable that the graft copolymer is a mixture of the graft copolymers B-I and B-II where the ratio by weight of graft copolymer B-I to graft copolymer B-II is in the range from 90:10 to 10:90, preferably from 80:20 to 20:80 and particularly preferably from 70:30 to 35:65.

It is preferable that the graft copolymers B-I and B-II described above are separately produced and worked up (i.e. the steps a) to c) of the invention (precipitation of the graft copolymers, dewatering of the water-moist graft copolymers, preferably via filtration or centrifugation, and drying, preferably with use of a fluidized-bed dryer and/or of a pneumatic dryer), and are mixed in step d) with the thermoplastic copolymer A and optionally other components C and/or K.

It is also possible to mix the graft copolymers B-I and B-II described above after separate production, and to precipitate these together (coprecipitation) (step a)) and then to carry out further work-up of these together.

It is moreover possible to use a known agglomeration process to obtain graft copolymers with different particle sizes, in particular with a bimodal particle size distribution of from 50 to 180 nm and from 200 to 700 nm. Graft copolymers with large and small particles are described by way of example in DE-A 36 15 607.

It is further preferably possible to use graft copolymers B which comprise two or more different graft shells B2. Graft copolymers with multistage graft shells are described by way of example in EP-A 0 111 260 and WO 2015/078751.

The monomers B21 and B22 used in the emulsion polymerization of the graft copolymer B are preferably mixtures of styrene and acrylonitrile in a ratio by weight of from 95:5 to 50:50, particularly preferably in a ratio by weight of from 80:20 to 65:35.

Molecular weight regulators can also be used in the production of the graft base B1 and/or during the emulsion polymerization of the at least one graft copolymers B, preferably in quantities of from 0.01 to 2% by weight, particularly preferably in quantities of from 0.05 to 1% by weight (based in each case on the entire quantity of monomer in the emulsion polymerization). Examples of suitable molecular weight regulators are alkyl mercaptans, for example n-dodecyl mercaptan, tert-dodecyl mercaptan, dimeric α-methylstyrene and terpinols.

Any desired initiators can be used in the production of the graft base B1 and/or in the emulsion polymerization of the at least one graft copolymer B. It is preferable to use at least one organic and/or inorganic peroxide compound (comprising at least one peroxide group R—O—O—H and/or R—O—O—R) as initiator. In particular, inorganic peroxide salts are used, for example peroxodisulfates (persulfates), and perphosphates and perborates of ammonium, sodium or potassium. Particular preference is given to sodium persulfates and potassium persulfates.

In a preferred embodiment, an inorganic peroxide salt, in particular an inorganic peroxodisulfate salt, preferably sodium peroxodisulfate and/or potassium peroxodisulfate, is used in the emulsion polymerization of the graft copolymer B.

Conventional anionic emulsifiers can typically be used in the production of the graft base B1 and/or during the emulsion polymerization to produce the at least one graft copolymer B. The following are preferred as emulsifiers: alkyl sulfates, alkylsulfonates, arylalkylsulfonates, soaps of saturated or unsaturated fatty acids, and also alkaline disproportionated or hydrogenated abietic or tall oil acids or a mixture thereof. It is preferable to use emulsifiers having carboxy groups (e.g. disproportionated abietic acid, salts of $C_{10}$-$C_{18}$ fatty acids, emulsifiers as in DE-A 36 39 904 and DE-A 39 13 509).

Suitable buffer substances are typically used in the production of the graft copolymer B, examples being sodium carbonate and sodium hydrogencarbonate. Suitable emulsifiers, buffer substances and initiators are moreover described in WO 2015/150223 and WO 2015/078751.

The polymerization temperature during emulsion polymerization of the graft copolymer B is generally from 25 to 160° C., preferably from 40 to 90° C. Suitable emulsifiers are stated above. Conventional temperature control, e.g. isothermal, can be used here; however, the graft polymerization is preferably carried out in a manner such that the temperature difference between the beginning and end of the reaction is at most 20° C., preferably at most 15° C., and particularly preferably at most 5° C.

Production of the graft copolymer B, in particular of the graft copolymers B-I and B-II, is achieved in the invention by means of emulsion polymerization. The person skilled in the art is aware of familiar embodiments of emulsion polymerization using batch operation or continuous operation.

In particular, the monomers of the graft shell B2, i.e. the monomers B21 and B22, are added separately or in the form of monomer mixture continuously to the graft base B2, in the stated quantities and ratios, and polymerized. The monomers here are typically added to the graft base B1 in a manner known to the person skilled in the art.

Other Polymeric Components C

The thermoplastic molding compositions can comprise not only the polymer components A and B mentioned but also, as other polymeric component C, rubber-free thermoplastic resins not composed of vinyl monomers. These thermoplastic resins are in particular polycondensates, e.g. aromatic polycarbonates, aromatic polyester carbonates, polyesters and polyamides.

Suitable thermoplastic polycarbonates and polyester carbonates are known and are described by way of example in DE-A 14 95 626, DE-A 22 32 877, DE-A 27 03 376, DE-A 27 14 544, DE-A 30 00 610, DE-A 38 32 396, DE-A 30 77 934, and also in particular in DE-A 100 08 420 and EP-A 2 606 073. It is preferable that the other polymeric component C is at least one polymer selected from polymethyl (meth) acrylate (PMA, PMMA), polyamide and polycarbonate.

In one embodiment, the thermoplastic molding composition is an ASA blend comprising from 1 to 90% by weight, preferably from 10 to 85% by weight, particularly preferably from 20 to 50% by weight, with particular preference from 1 to 30% by weight, based on the entire thermoplastic molding composition, of at least one rubber-free other polymeric component C not composed of vinyl monomers and preferably selected from polycarbonates, polyester carbonates and polyamides. It is preferable that the thermoplastic molding composition is a PC/ASA blend comprising from 1 to 90% by weight, preferably from 10 to 85% by weight, particularly preferably from 20 to 50% by weight, often from 10 to 40% by weight, based on the entire thermoplastic molding composition, of at least one aromatic polycarbonate and/or aromatic polyester carbonate as other polymeric component C.

The definition of polycarbonates in particular includes the esters of carbonic acid (condensates of aromatic diphenols with acyl halides, in particular phosgene) and aromatic polyester carbonates (condensates of diphenols with aromatic diacyl halides). It is also possible to use mixed condensates as aromatic polyester carbonates, where the proportion of carbonate groups can be up to 50 mol %, in particular up to 80 mol %, particularly preferably up to 100 mol %, based on the entirety of the carbonate groups and of the ester groups. Ester groups and carbonate groups in the condensates can occur in the form of blocks or in random distribution.

It is preferable to use halogen-free aromatic polycarbonates as component C. Preference is in particular given to halogen-free aromatic polycarbonates based on bisphenol A. For the purposes of the present invention, a halogen-free polycarbonate is a polycarbonate composed of halogen-free diphenols, of halogen-free chain terminators and of halogen-free crosslinking agents. Polycarbonates which comprise small proportions, typically in the ppm range, of hydrolyzable chlorine compounds which by way of example result from the production procedure using phosgene are not considered to be halogen-containing polycarbonates.

In a preferred embodiment, the aromatic polycarbonate as component C is based on a diphenol of the formula (II)

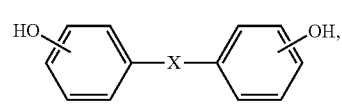

(II)

where X is a single bond, $C_1$-$C_3$-alkylene, $C_2$-$C_3$-alkylidene, $C_3$-$C_6$-cycloalkylidene, —S— or —SO$_2$—.

Examples of preferred diphenols of the formula (II) are hydroquinone, resorcinol, 4,4'-dihydroxyphenol, 2,2-bis(4-hydroxyphenyl)propane, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane. Particular preference is given to 2,2-bis(4-hydroxyphenyl)propane and 1,1-bis(4-hydroxyphenyl)cyclohexane. The diphenols can be used separately or in any desired mixture. The dipenols and production thereof are described in the literature. Preference is in particular given to the use of polycarbonates or polyester carbonates produced from 2,2-bis(4-hydroxyphenyl)propane (bisphenol A).

The other polymeric component C can be homopolycarbonates or copolycarbonates, in particular homopolycarbonates or copolycarbonates of bisphenol A.

Suitable polycarbonates can have branching, which is obtained in a known manner via copolymerization of about 0.05 to 2.0 mol %, based on the molar quantity of diphenol, of an at least trifunctional compound, in particular a compound having three or more phenolic OH groups.

The relative viscosity $\eta_{rel}$ of preferred polycarbonates is in particular in the range from 1.10 to 1.50, preferably from 1.20 to 1.40. Preferred polycarbonates have, in particular, a weight-average molar mass $M_w$ in the range from 10 000 to 200 000 g/mol, preferably from 20 000 to 80 000 g/mol, and/or viscosity numbers in the range from 20 to 100 ml/g, preferably from 40 to 80 ml/g, measured in accordance with DIN 53727 in 0.5% by weight solution in methylene chloride at 23° C.

Polyorganosiloxane polycarbonates can moreover be used as other polymeric component C. Polyorganosiloxane polycarbonates are described by way of example in DE-A 33 34 782.

Processes for the production of polycarbonates are known to the person skilled in the art. Polycarbonates can by way of example be produced via reaction of diphenols with phosgene in an interfacial process or in a homogeneous phase (known as the pyridine process). Production by means of melt polymerization via reaction of diphenols with, for example, diphenyl carbonate is equally possible. A suitable quantity of a chain terminator is typically used in order to achieve the desired molecular weight and the desired viscosity number. Examples of suitable chain terminators are phenol, p-tert-butylphenol and long-chain mono- or dialkylphenols, for example 4-(1,3-tetramethylbutyl)phenol (e.g. described in DE-A 28 42 005), preferably having from 8 to 20 carbon atoms in the alkyl chain (e.g. described in DE-A 35 06 472), for example p-nonylphenol, 3,5-di-tert-butylphenol, p-tert-octylphenol, p-dodecylphenol, 2-(3,5-dimethylheptyl)phenol and 4-(3,5-dimethylheptyl)phenol. The quantity typically used of the chain terminator is from 0.5 to 10 mol %, based on the molar quantity of the diphenol.

Suitable aromatic polycarbonates (polycarbonates and polyester carbonates) and production thereof are known to the person skilled in the art and are described inter alia in DE-A 3 077 934. Aromatic polyester carbonates are typically obtained via reaction of diphenols with an aromatic diacyl halide, preferably selected from benzenedioyl halides. The following can preferably be used as diacyl halides: diacyl chlorides of isophthalic acid, terephthalic acid, diphenyl ether 4,4'-dicarboxylic acid and naphthalene-2,6-dicarboxylic acid. Preference is in particular given to mixtures of the diacyl chlorides of isophthalic acid and terephthalic acid, preferably in a ratio of from 1:20 and 20:1. Acyl halides, preferably phosgene, can also be used as comonomers in the production of polyester carbonates.

The aromatic polyester carbonates used as component C can be linear or branched (e.g. described in DE-A 2 940 024 and DE-A 3 007 934).

In a preferred embodiment, the thermoplastic molding composition comprises from 1 to 90% by weight, preferably from 10 to 85% by weight, with particular preference from 10 to 40% by weight, of at least one aromatic polycarbonate as component C which is composed of 2,2-bis(4-hydroxyphenyl)propane (bisphenol A) and phosgene; polycarbonates produced from precursors or synthetic structural blocks of bisphenol A and phosgene are equally included here.

Other Components K

The necessary or advantageous additives can be added to the molding compositions of the invention during production, work-up, further processing and final shaping, examples being antioxidants, UV stabilizers, peroxide destroyers, antistatic agents, lubricants, mold-release agents, flame retardants, pigments, fillers, reinforcing materials (glass fibers, carbon fibers, etc.), and colorants.

In order to protect the graft copolymers B from thermal degradation during work-up, and in order to permit safe and problem-free work-up, it is advisable to add the following in the form of one or more emulsions or dispersions to the graft copolymers B: antioxidants, e.g. one or more phenolic antioxidants, and also any desired other substances that increase the thermal stability of the graft copolymers, and to mix these by stirring.

Particulate mineral fillers can moreover be used as other component K, examples being amorphous silica, carbonates such as magnesium carbonate, calcium carbonate (chalk), powdered quartz, mica, a very wide variety of silicates such as clays, muscovite, biotite, suzoite, tin maletite, talc, chlorite, phlogopite, feldspar, and calcium silicate such as wollastonite or kaolin, particularly calcined kaolin. It is moreover possible to use fibrous fillers as other component K, examples being carbon fibers, potassium titanate whiskers, aramid fibers and glass fibers.

Familiar additives for ASA molding compositions are described by way of example in WO 2015/150223.

Step a)

The step a) of the invention comprises the precipitation of the at least one graft copolymer B after the emulsion polymerization procedure via addition of a precipitation solution comprising at least one salt.

In a preferred embodiment, the step a) of the invention comprises precipitation of the graft copolymers B-I and B-II described above separately or together via addition of the precipitation solution comprising at least one salt. The graft copolymers B-I and B-II are used here in their latex form after the emulsion polymerization procedure. The precipitated graft copolymers B-I and B-II are subjected to further work-up separately or together as described in the steps b) to d).

Aqueous salt solutions can in particular be used as precipitation solution for the precipitation of the at least one graft copolymer B after the emulsion polymerization procedure, examples being aqueous solutions of magnesium sulfate, kieserite, pentahydrite, hexahydrite, epsomite (Epsom salt), calcium chloride, sodium chloride and mixtures thereof. It is preferably also possible to use a mixture of aqueous salt solutions and acids (e.g. sulfuric acid, acetic acid) as precipitation solution. Preferred salts here are magnesium sulfate, kieserite ($Mg[SO_4].H_2O$), pentahydrite ($Mg[SO_4].5H_2O$), hexahydrite ($Mg[SO_4].6H_2O$), and epsomite ($Mg[SO_4].7H_2O$, Epsom salt); preferred acids are sulfuric acid, acetic acid and mixtures thereof. The precipitation of the at least one graft copolymer B in step a) is particularly preferably achieved via action of an aqueous salt solution where the salt is preferably selected from magnesium sulfate, kieserite, pentahydride, hexahydrite and epsomite (Epsom salt).

The concentration of salt, or salt and acid, in the precipitation solutions is typically in the range from 2 to 20% by weight, based on the precipitation solution. The precipitation of the at least one graft copolymer B in step a) can be achieved in a single stage or in a plurality of stages with addition of a plurality of precipitation solutions where the precipitation solutions can be identical or different.

The precipitation of the at least one graft copolymer B can preferably be carried out via addition of the precipitation solution continuously or in batches, or addition of the graft copolymer latex to the precipitation solution. In the case of continuous addition, the precipitation typically takes place in one or more continuously operated stirred containers, for example continuous stirred tanks.

In a particularly preferred embodiment, an aqueous magnesium sulfate solution is metered continuously and simultaneously in one or more stages into the graft copolymer B (latex).

The precipitation can be carried out in a temperature range from 20 to 150° C., preferably from 40 to 120° C., particularly preferably from 50 to 100° C.

After addition of the precipitation solution, the mixture can typically be transferred under pressure at from 100 to 150° C. into a sinter vessel.

Step b)

The step b) of the invention comprises the mechanical dewatering of the precipitated graft copolymer B, preferably by means of centrifugation and/or filtration, where a graft copolymer B with water content smaller than or equal to 50% by weight is obtained.

The water content value (alternatively termed residual moisture content value) typically states the proportion of water in percent by weight, based on the moist graft copolymer B. In particular, the water content is determined with the aid of suitable analysis equipment (e.g. moisture-analyzing balance), where the sample is dried until its weight is constant for a defined period. The water content of the graft copolymer B can by way of example be determined at 180° C. in a Halogen Moisture Analyzer HR73 from Mettler-Toledo until weight is constant for 30 seconds.

It is preferable that the mechanical dewatering of the precipitated graft copolymer B is achieved by means of centrifugation.

It is preferable that a graft copolymer B with water content in the range from 10 to 50% by weight, preferably from 20 to 40% by weight, with particular preference from 25 to 35% by weight, is obtained in step b) or in a downstream washing step as described below.

In another embodiment, the mechanical dewatering of the graft copolymer B is followed by a washing step where the dewatered graft copolymer B is preferably treated with water or with a mixture of water with a polar, water-miscible, organic solvent. After the treatment, the water or the mixture is preferably removed by filtration and/or centrifugation. This preferably produces a graft copolymer B with water content smaller than or equal to 50% by weight.

Step c)

The step c) of the invention comprises the drying of the dewatered graft copolymer B with water content smaller than or equal to 50% by weight with use of a drying gas, where the graft copolymer B is moved within the drying gas and the temperature of the drying gas in the range from 50 to 160° C., preferably from 55 to 155° C., particularly preferably from 60 to 150° C.

In particular, the graft copolymer B is moved together with the current of drying gas; in particular, the graft copolymer B is entrained by the current of drying gas.

It is preferable to use air, nitrogen, or any desired mixture thereof as drying gas.

In a preferred embodiment, the drying of the dewatered graft copolymer B in step c) uses a fluidized-bed dryer and/or a pneumatic dryer (flash dryer). It is preferable that the drying is achieved with use of a fluidized-bed dryer or with use of a combination of a fluidized-bed dryer with a pneumatic dryer. In particular, the fluidized-bed dryer can have one or more heat exchangers.

Fluidized-bed dryers and pneumatic dryers (flash dryers) are known to the person skilled in the art. In particular, they are drying devices for flowable particulate materials, as described in Krischer/Kroll, Trocknungstechnik [Drying technology], Zweiter Band, Trockner and Trocknungsverfahren [Second volume, Dryers and drying processes] (Springer-Verlag, 1959). Fluidized-bed dryers are described by way of example on pages 275 to 282 of the abovementioned document. Pneumatic dryers, also termed flash dryers, are described in the abovementioned document by way of example on pages 282 ff.

In fluidized-bed dryers, a gas, in particular warm air or hot gases, preferably a drying gas selected from air and/or nitrogen with temperature in the range from 50 to 160° C., flows upward (i.e. against the direction of gravitational force) through the material to be dried (i.e. the dewatered graft copolymer B with water content smaller than or equal to 50% by weight), thus causing suspension, but not entrainment, of said material. This generally produces a layer in which the particles of the material to be dried undergo constant upward and downward movement, and which can resemble a bubbling liquid.

Fluidized bed is a frequently used term. The flow conditions of the respective system must typically be adjusted in a manner that produces the desired fluidized layer. Fluidized-bed dryers generally comprise a fluidizing chamber in which the material to be dried is lying by way of example on a sieve tray through which the drying gas flows upward through the material, at least one input device for the (moist) material to be dried, and at least one collection and removal device (collector) for the dried material.

In particular, the average residence time of the graft copolymer B in the fluidized-bed dryer is from 1 to 60 min, preferably from 5 to 50 min, particularly preferably from 10 to 40 min.

In a preferred embodiment, the drying of the dewatered graft copolymer B in step c) uses a fluidized-bed dryer which has one or more heat exchangers integrated into the fluidized bed. By using heat exchangers it is in particular possible to introduce drying energy into the fluidized bed—in addition to the drying energy of the hot drying gas. Familiar embodiments of heat exchangers, for example plate, ribbed-tube, tubular, and spiral heat exchangers, are known to the person skilled in the art and are described in standard works. It is possible by way of example to use fluidized-bed dryers that are described in D. Gehrmann, et al., Trocknungstechnik in der Lebensmittelindustrie [Drying technology in the food industry] (Behr's Verlag GmbH & Co. KG, $1^{st}$ edn., 2009, section 2.5.3 Statische Wirbelschichttrockner [Static fluidized-bed dryers], pp. 143-145). The temperatures at which the heat exchangers are operated are preferably in the range from 50 to 100° C., preferably from 55 to 90° C., particularly preferably from 60 to 85° C. In particular, the inlet temperature of the heat exchange medium (for example water) is from 50 to 100° C., preferably from 55 to 90° C., particularly preferably from 60 to 85° C.

In pneumatic dryers, the material to be dried (i.e. the dewatered graft copolymer B with water content smaller than or equal to 50% by weight) is typically entrained by flowing gases, in particular warm air or hot gases, preferably by a drying gas selected from air and/or nitrogen with temperature in the range from 50 to 160° C., and thus dried. The current of drying gas here transfers energy to the material to be dried, and conducts the resultant water vapor away. Pneumatic dryers are typically configured as horizontal or vertical tube which typically comprises at least one input device for the (moist) material to be dried and at least one collection and removal device (collector) for the dried material.

The average residence time of the graft copolymer B in the pneumatic dryer is typically from 1 to 300 seconds, preferably from 1 to 120 seconds, particularly preferably from 5 to 60 seconds.

In step c) it is possible to operate one or more fluidized-bed dryers and/or one or more pneumatic dryers batchwise or continuously.

The maximal product temperature in the drying step c), i.e. the temperature of the at least one graft copolymer B (fluidized-bed temperature) reached during the drying step c) is in particular below 100° C., preferably below 95° C. and very preferably below 90° C. The product temperature typically rises during the course of the drying step. The average product temperature during the drying step c) is preferably in the range from 30 to 100° C., preferably from 40 to 95° C. In a preferred embodiment, the product temperature during drying in a batch process is initially in the range from 30 to 100° C., preferably from 30 to 60° C., with particular preference from 35 to 50° C., and at the end of the drying procedure is in the range from 50 to 100° C., preferably from 70 to 95° C. In a preferred embodiment, the product temperature during the drying in a continuous process in a first zone of the dryer is in the range from 30 to 100° C., preferably from 30 to 60° C., with particular preference from 35 to 50° C., and in the final zone of the dryer is in the range from 50 to 100° C., preferably from 70 to 100° C.

In a preferred embodiment, step c) comprises the cooling of the dried graft copolymer B after drying to a temperature of from 30 to 50° C., preferably via a current of cooling gas. By way of example, the dried graft copolymer B can be cooled by a current of cooling gas, for example air, at the top of the fluidized-bed dryer. The temperature of the current of cooling gas is by way of example from 10 to 40° C., preferably from 15 to 25° C.

The average residence time of the graft copolymer B in the fluidized-bed dryer and/or pneumatic dryer is typically from 1 second to 60 min, preferably from 5 seconds to 40 min. It is in principle advantageous to set shorter residence times and higher temperatures in the pneumatic dryer than in the fluidized-bed dryer.

The drying step of the invention in particular permits achievement of particularly rapid and uniform drying, and this in particular leads to small salt inclusions, for example in the form of salt crystals, which result in few surface defects visible to the naked eye.

The drying step of the invention should therefore in particular ensure rapid and effective heat transfer between the drying gas and the graft copolymer B to be dried, while however avoiding high temperatures of the actual graft copolymer B to be dried.

The drying in step c) is preferably carried out by means of a drying gas selected from air and/or nitrogen,
  where the drying is carried out with use of a fluidized-bed dryer, and the temperature of the drying gas is in the range from 50 to 160° C., preferably from 55 to 140° C., particularly preferably from 60 to 120° C.;
  or where the drying is carried out with use of a pneumatic dryer, and the temperature of the drying gas is in the range from 100 to 160° C., preferably from 110 to 155° C., particularly preferably from 130 to 150° C.

It is further preferable that the drying in step c) is carried out by means of a drying gas selected from air and/or nitrogen
  where the drying is carried out with use of a fluidized-bed dryer which has at least one heat exchanger integrated into the fluidized bed; where the temperature of the drying gas is in the range from 50 to 160° C., preferably from 55 to 140° C., particularly preferably from 60 to 120° C., and where the temperature at which the at least one heat exchanger is operated is in the range from 55 to 165° C., preferably from 60 to 145° C., particularly preferably from 65 to 125° C.

With particular preference, the drying in step c) is carried out by means of a drying gas selected from air and/or nitrogen,
  where the drying is carried out with use of a fluidized-bed dryer, preferably of a fluidized-bed dryer which has at least one heat exchanger integrated into the fluidized bed, the temperature of the drying gas is in the range from 50 to 160° C., preferably from 50 to 120° C., and the average residence time of the graft copolymer B in the fluidized-bed dryer is from 1 to 60 min, preferably from 5 to 50 min, particularly preferably from 10 to 40 min;
  or where the drying is carried out with use of a pneumatic dryer, the temperature of the drying gas is in the range from 100 to 160° C., and the average residence time of the graft copolymer B in the pneumatic dryer is from 1 to 300 seconds, preferably from 1 to 120 seconds, particularly preferably from 5 to 60 seconds.

In a preferred embodiment of the invention, the drying described above is continued for a further 10 to 30 min, preferably from 15 to 20 min, starting at the juncture at which a water content of 10% by weight, preferably of 7.5% by weight, with particular preference of 5% by weight (or less), is achieved.

In a preferred embodiment of the invention, the drying described above is continued for a further 5 to 30 min, preferably from 5 to 15 min, starting at the juncture at which a water content of 2% by weight, preferably of 1% by weight, with particular preference of 0.5% by weight (or less), is achieved.

In a preferred embodiment, the water content of the dried graft copolymer B is in the range from 0.01 to 1% by weight, preferably from 0.1 to 0.8% by weight, with particular preference from 0.1 to 0.5% by weight, particularly preferably from 0.2 to 0.4% by weight.

The drying step of the invention in particular permits reduction of the total content of residual monomers in the graft copolymer B to a value smaller than 200 ppm, preferably smaller than 100 ppm, based in each case on the dry graft copolymer B (based on the solids content of the graft latex). The content of styrene in the graft copolymer B is preferably reduced to a value smaller than 30 ppm, in particular smaller than 10 ppm, based in each case on the dry graft copolymer B. The content of acrylonitrile in the graft copolymer B is preferably reduced to a value smaller than 10 ppm, in particular smaller than 5 ppm, based in each case on the dry graft copolymer B.

For the purposes of the present application, the term "ppm" means "mg/kg".

The expression "residual monomers" means unreacted monomers and conversion products of these. In particular, the total content of residual monomers comprises the content of styrene, acrylonitrile, butyl acrylate and ethylbenzene, preferably the content of acrylonitrile, styrene and ethylbenzene, in the polymer.

In a preferred embodiment, the water content of the dried graft copolymer B is in the range from 0.05 to 0.6% by weight, with particular preference from 0.1 to 0.5% by weight, particularly preferably from 0.1 to 0.4% by weight, and its total content of residual monomers is smaller than 200 ppm, preferably smaller than 100 ppm, in particular in the range from 10 to 200 ppm, preferably from 15 to 100 ppm, based in each case on the dry graft copolymer B.

Step d)

The step d) of the invention comprises the mixing of the thermoplastic copolymer A with the dried graft copolymer B from step c), and optionally the other polymeric component(s) (C) and optionally the other component(s) K.

Step d) preferably comprises the mixing of the thermoplastic copolymer A with the precipitated and dried graft copolymer B-I and/or B-II and optionally the other polymeric component C, and optionally the at least one other component K, preferably selected from fillers, additives and auxiliaries. This mixing preferably takes place in an extruder.

The processes and devices for carrying out the step d) are in essence known to the person skilled in the art. Step d) typically comprises melt compounding and/or melt extrusion, and is preferably carried out in internal mixers, extruders and/or twin-screw systems.

The mixing in step d) preferably takes place at temperatures of from 200 to 300° C.

The mixing of the thermoplastic copolymer A with the at least one dried graft copolymer B from step c) and optionally other components K can be achieved in a known manner either successively or simultaneously. It is moreover possible to begin by mixing some components at temperatures of from 15 to 40° C., in particular at room temperature (about 20° C.), and subsequently to increase the temperature to from 200 to 300° C., optionally with addition of other components.

The invention moreover provides the use of a fluidized-bed dryer, preferably of a fluidized-bed dryer which has one or more heat exchangers integrated into the fluidized bed, and/or of a pneumatic dryer (flash dryer) in the production of a thermoplastic molding composition as described above for the drying of the graft copolymer B, the water content of which is lower than or equal to 50% by weight, after emulsion polymerization, precipitation and mechanical dewatering of the graft copolymer B, in order to improve the surface quality of the thermoplastic molding composition comprising the graft copolymer B. In particular, this is a thermoplastic ASA molding composition.

The embodiments described above, in particular the embodiments relating to the thermoplastic molding composition and components thereof, and also the process steps a) to d), are applicable correspondingly to the inventive use.

In a preferred embodiment, the invention provides for use as described above where the drying of the graft copolymer B is carried out in a fluidized-bed dryer and/or a pneumatic dryer by means of a drying gas selected from air and/or nitrogen, and the temperature of the drying gas is in the range from 50 to 160° C., preferably from 55 to 155° C., particularly preferably from 60 to 150° C.

In particular, the present invention provides the use as described above where the improvement of the surface quality of the thermoplastic molding composition comprises an increase of the surface homogeneity of the thermoplastic molding composition or of the molding produced therefrom. The expression "increase of surface homogenity" means in particular increase of gloss and smoothness of the surface and/or reduction of the number of surface defects. Particular surface defects that can be mentioned (caused for example by salt inclusions) are spots, cracks and depressions (cavities).

In particular, the present invention provides the use as described above where the improvement of the surface quality of the thermoplastic molding composition comprises reduction of the number of surface defects after storage of the molding composition under moist, warm environmental conditions.

The expression "moist, warm environmental conditions" in particular means conditions comprising temperature higher than the usual values of from 15 to 20° C. and humidity higher than relative humidity of from 30 to 60%. Moist, warm environmental conditions can moreover in particular comprise direct contact of the surface with liquid water (e.g. in the form of condensing vapor (mist, fog) and/or condensation). In particular, the expression "moist, warm environmental conditions" comprises for the purposes of the invention a temperature in the range from 25 to 100° C., preferably from 40 to 90° C., particularly preferably from 50 to 80° C., and relative humidity in the range from 65 to 100%, preferably from 80 to 100%, and/or direct action of liquid water at a temperature in the range from 30 to 100° C., preferably from 40 to 90° C., particularly preferably from 50 to 80° C., on the surface of the molding composition or of the molding produced therefrom. The stated conditions typically refer to atmospheric pressure of 1.013 bar, typically represented by a range of from 0.9 to 1.1 bar.

The relative humidity $f_R$ usually states the percentage ratio of absolute humidity f (mass of water vapor in a defined volume, e.g. in $g/m^3$) to the maximal humidity $f_{max}$ at a given temperature. The maximal humidity $f_{max}$ describes the maximal possible mass of water vapor in a defined volume of air at a given temperature (saturation). Relative humidity can be determined from the following formula $$f_R = (f/f_{max}) * 100\%$$

and therefore assumes values of from 0 to 100%. At relative humidity above 100%, water vapor therefore generally condenses, for example in the form of fog.

In this sense, the invention preferably provides the use described above of a fluidized-bed dryer, preferably of a fluidized-bed dryer with one or more heat exchangers integrated into the fluidized bed, and/or of a pneumatic dryer in the production of a thermoplastic molding composition for improvement of surface quality, where the improvement of surface quality comprises reduction of the number of surface defects after storage of the molding composition, or of the moldings produced therefrom, at a temperature in the range from 30 to 100° C. and relative humidity in the range from 65 to 100%, and/or after direct action of liquid water at a temperature in the range form 30 to 100° C. on the surface of the molding composition (moist, warm environmental conditions).

The expression "improvement of surface quality" for the purposes of the invention means in particular that after storage for at least one hour, preferably after storage over a period of from 2 to 48 h, preferably from 5 to 24 h, under moist, warm environmental conditions as described above, few or no surface defects, in particular spots and/or depressions caused by salt inclusions, are visible to the naked eye. In particular, the expression "improvement of surface quality" means that after storage under moist, warm conditions the number of surface defects, in particular spots and/or depressions, visible to the naked eye on an area of 150 $cm^2$ is less than 15, preferably less than 10, particularly preferably less than 6.

In a preferred embodiment, the improvement of surface quality of the thermoplastic molding composition comprises the avoidance or reduced incidence of salt inclusions with size more than 0.3 mm, preferably more than 0.2 mm and with particular preference more than 0.1 mm. In particular, the inventive use can avoid or reduce formation of large salt inclusions visible to the naked human eye in the thermoplastic molding compositions or in the moldings produced therefrom, in particular to the extent described above.

Salt inclusions not visible to the naked human eye are defined as those which in respect of size and density are graded "1 S1" in accordance with DIN EN ISO 4628-2. Surfaces without salt inclusions visible to the naked human eye are typically graded "0" in accordance with DIN EN ISO 4628-2.

A preferred aspect of the improvement of surface quality is that the size of at least 80%, preferably at least 90%, in particular at least 99%, of the salt inclusions, based on the total number of salt inclusions in the surface of the thermoplastic molding composition or in the moldings produced therefrom is smaller than 0.3 mm, preferably smaller than 0.2 mm, with particular preference smaller than 0.1 mm, very particularly preferably smaller than 0.01 mm. The size determined for a salt inclusion can preferably be its diameter. The improvement of surface quality of the thermoplastic molding composition preferably comprises the avoidance or reduced incidence of salt inclusions as described above after storage under moist, warm conditions as defined above.

The salt inclusions preferably comprise (or consist in essence of) salts comprised in the molding composition as a result of a production process, in particular salts which are used for the precipitation of the at least one graft copolymer B. The salt inclusions therefore preferably comprise salts of the abovementioned precipitating agents, for example magnesium sulfate, kieserite, pentahydride, hexahydride, epsomite, calcium chloride, sodium chloride or a mixture thereof. The inclusions can moreover also comprise salts derived from the acids used, for example sulfates, acetates and chlorides.

The salt inclusions can moreover also comprise salts derived from other additives used during the production procedure, e.g. emulsifiers. The salt inclusions preferably comprise magnesium sulfate.

With particular preference, the salt inclusions comprise magnesium sulfate as substantial constituent, for example more than 80% by weight thereof, based on the weight of the salt inclusions.

The invention moreover provides the use of a fluidized-bed dryer, preferably in a fluidized-bed dryer which has one or more heat exchangers integrated into the fluidized bed, and/or of a pneumatic dryer (flash dryer) in the production of a thermoplastic molding composition, as described above, for the drying of the graft copolymer B, the water content of which is lower than or equal to 50% by weight, after emulsion polymerization, precipitation and mechanical dewatering of the graft copolymer B, in order to reduce the total content of residual monomers, preferably to a value below 200 ppm, in particular below 100 ppm, based on the dry graft copolymer B. The use preferably provides the drying of the graft copolymer B to water content below 1% by weight, preferably below 0.8% by weight.

The invention also provides thermoplastic molding compositions obtainable via the process of the invention, and also the moldings produced therefrom.

The invention preferably provides a thermoplastic molding composition obtainable via the process of the invention, where the thermoplastic molding composition comprises salt inclusions and where the size of at least 80% of the salt inclusions, preferably at least 90%, in particular at least 99% (based on the total number of salt inclusions) is smaller than 0.3 mm, preferably smaller than 0.2 mm, with particular preference smaller than 0.1 mm, very particularly preferably smaller than 0.01 mm. It is preferable that the size stated for salt inclusions is the diameter, or another characteristic linear dimension of the salt inclusion.

The composition of the thermoplastic molding composition of the invention has been described above in connection with the process of the invention.

The molding compositions of the invention can be used for the production of moldings of any type. These can be produced by injection molding, extrusion and blow-molding processes. Another type of processing is the production of moldings by thermoforming from previously produced sheets or films, and film insert molding. Examples of such moldings are films, profiles, and housings of all types, e.g. for household appliances such as juice presses, coffee machines, mixers; for office equipment such as monitors, printers, copiers; external and internal parts for automobiles; sheets, pipes, electrical installation ducts, windows, doors and other profiles for the construction sector (internal fittings and external applications), and also electrical and electronic parts such as switches, plugs and plug sockets.

In particular, the molding compositions of the invention can by way of example be used for the production of the following moldings: internal fittings for rail vehicles, ships, aircraft, buses and other motor vehicles, external bodywork parts in the motor vehicle sector, housings of electrical equipment comprising small transformers, housings for equipment for the processing and transmission of information, housings and cladding for medical equipment, massage equipment and housings therefor, toy vehicles for children, sheet-like wall elements, housings for safety equipment, thermally insulated transport containers, apparatus for the keeping or care of small animals, moldings for sanitary and bath equipment, grilles for ventilator openings, moldings for garden sheds and tool sheds, and housings for garden equipment.

The embodiments described above relating to the thermoplastic molding composition, in particular the thermoplastic copolymer A and the graft copolymer B, and relating to the process steps a) to d) are applicable correspondingly to the molding composition of the invention and to moldings produced therefrom.

FIG. 1 describes the content of styrene (S) in ppm (squares ■) and the residual moisture content (RMC) (diamond ♦) in the graft copolymer B-I as in example 1 as a function of drying time (t [min]).

Figure 2:
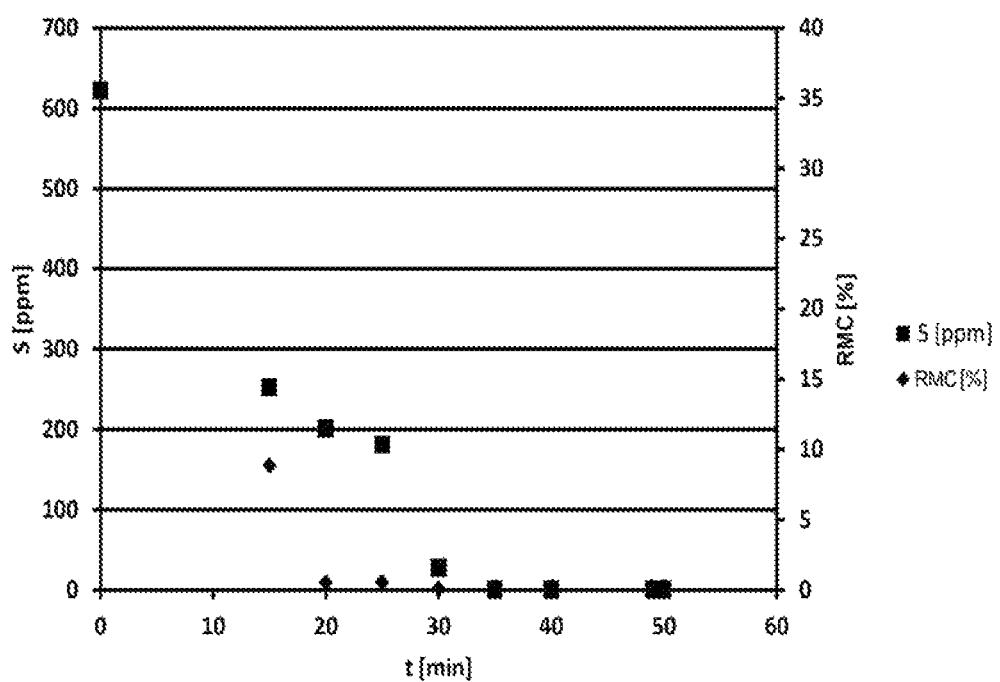

FIG. 2 describes the content of styrene (S) in ppm (squares ■) and the residual moisture content (RMC) (diamond ♦) in the graft copolymer B-II as in example 1 as a function of drying time (t [min]).

The invention is explained in more detail via the following examples and claims.

EXAMPLES

Example 1: Production of Components

Thermoplastic Copolymer A

Thermoplastic copolymers produced by free-radical solution polymerization with peroxidic initiation were various random styrene/acrylonitrile copolymers and alpha-methylstyrene/acrylonitrile copolymers. The ratio of styrene or alpha-methylstyrene to acrylonitrile was varied.

The viscosity number VN was determined in accordance with DIN EN ISO 1628-1 and -2 in 0.5% solution in N,N-dimethylformamide (DMF) at 23° C.

The following copolymers A were used:

A-I: Styrene/acrylonitrile in ratio by weight 65:35, viscosity number VN=80 cm$^3$/g A-II: Styrene/acrylonitrile in ratio by weight 65:35, viscosity number VN=60 cm$^3$/g A-III: Styrene/acrylonitrile in ratio by weight 81:19, viscosity number VN=70 cm$^3$/g A-IV: alpha-Methylstyrene/acrylonitrile in ratio by weight 70:30, viscosity number VN=57 cm$^3$/g.

Other polymeric component C used was Makrolon® 2800 as polycarbonate C-I.

Graft Copolymer B

Two graft copolymers B-I and B-II were produced, differing in the size of the latex particles.

Graft Copolymer B-I (Small-Particle ASA Graft Copolymer)

The graft bases B1 were produced by a method based on EP-A 0450485 (graft copolymer A, page 7).

a1) Production of the Graft Base B1-I 16 parts by weight of butyl acrylate (BA) and 0.4 part by weight of dicyclopentadienyl acrylate (DCPA) were heated to 60° C., with stirring, in 150 parts by weight of water with addition of one part of the sodium salt of a C12-C18-paraffinsulfonic acid, 0.3 part by weight of potassium peroxodisulfate and 0.38 part by weight of sodium bicarbonate. 10 minutes after the start of the polymerization reaction, a mixture of 82 parts by weight of butyl acrylate with 1.6 parts by weight of DCPA was added within 3 hours. After monomer addition had ended, reaction was allowed to continue for one further hour. The solids content of the resultant crosslinked butyl acrylate polymer rubber was 40% by weight. The particle size distribution was narrow (quotient Q=0.20).

a2) Production of the Graft Copolymer B-I 4200 g of the latex emulsion produced as specified in (a1) were mixed with 2300 g of water and 5.4 g of potassium peroxodisulfate, and heated to 65° C., with stirring. Once the reaction temperature had been reached, a mixture of 840 g of styrene with 280 g of acrylonitrile was added over the course of 3 hours. Once the addition had ended, the emulsion was kept at 65° C. for a further 2 hours. The median particle size of the resultant graft copolymer latex was 95 nm. Work-up was achieved as described below.

Graft Copolymer B-II (Large-Particle ASA Graft Copolymer)

b1) Production of the Graft Base B1-II

The following were added to an initial charge made of 2.5 parts by weight of the rubber produced as described in a1), after addition of 50 parts by weight of water and 0.1 part by weight of potassium peroxodisulfate, over the course of 3 hours: firstly a mixture of 49 parts by weight of butyl acrylate with 1 part by weight of DCPA and secondly a solution of 0.5 part by weight of the sodium salt of a $C_{12}$- to $C_{18}$-paraffinsulfonic acid in 25 parts by weight of water. The temperature of the initial charge here was 60° C. Once the feed procedure had ended, polymerization was continued for two hours. The solids content of the resultant rubber was 40%. The median particle size (weight average) of the rubber was determined as 480 nm.

b2) Production of the Graft Copolymer B-II 150 parts by weight of the rubber obtained as in b1) were mixed with 15 parts by weight of styrene and 60 parts by weight of water, and heated to 65° C. for 3 hours, with stirring, after addition of a further 0.03 part by weight of potassium peroxodisulfate and 0.05 part by weight of lauroyl peroxide. The resultant dispersion was polymerized for a further 4 hours with 25 parts by weight of a mixture of styrene with acrylonitrile in the ration 75:25. The median particle size of the resultant graft copolymer latex was 530 nm. Work-up was achieved as described below.

Precipitation of the Graft Copolymers B

The graft copolymers B-I and B-II as described above were separately coagulated continuously by a magnesium sulfate solution.

For this, the respective graft copolymer B-I or B-II and a magnesium sulfate solution (18% by weight) were metered continuously into a first stirred precipitation container. Steam was injected into the system to maintain the precipitation container at 60° C. in the case of graft copolymer B-I and at 88° C. in the case of graft copolymer B-II. The concentrations maintained here in precipitation container I were as follows:

0.8% by weight of magnesium sulfate, based on the entire aqueous phase, and

18% by weight of graft copolymer B-I or B-II, calculated as solid, based on all of the substances added in the precipitation container.

The average residence time in the first precipitation container was 15 minutes. In order to complete the precipitation procedure, the contents from the first precipitation container were metered continuously into a second precipitation container. The average residence time in the second precipitation container was 15 minutes, and the temperature was kept at about 92 to 94° C. The precipitated graft copolymer from the second precipitation container was cooled to 70° C. and then separated from the aqueous phase by centrifugation to give a water-moist graft copolymer B with residual moisture content 30% by weight.

Example 2: Drying of the Graft Copolymers B

The graft copolymer B-I or B-II obtained after precipitation and dewatering was dried in various ways. In each case, one of the following drying steps described at a later stage below was carried out:

2A Drying in a fluidized-bed dryer
2B Drying in a pneumatic dryer
2C Drying in an extruder Example 2A: Drying of the Graft Copolymer B by a Fluidized-Bed Dryer The water-moist graft copolymer B (precipitated graft copolymer B-I or B-II, produced as described above) with residual moisture content 30% by weight was dried in a batch fluidized-bed dryer with air as carrier gas. Residence time was in each case 25 minutes. The temperature of the air was about 110° C., and the product temperature was in the range from 39 to 81° C.; table 1 below shows how the product temperature and the drying gas temperature varied as a function of time.

TABLE 1

Temperature variation during batch fluidized-bed drying

| | Time [min] | | | | | |
|---|---|---|---|---|---|---|
| | 0 | 5 | 10 | 15 | 20 | 25 |
| Temperature of drying gas TG [° C.] | 109.5 | 109.4 | 109.6 | 109.6 | 108.0 | 96.6 |
| Product temperature TP [° C.] | | 38.9 | 38.1 | 38.0 | 44.4 | 80.8 |

Residual moisture content after the drying procedure was 0.5% by weight. The material was obtained in the form of a fine-particle powder with median grain size $d_{50}$ 800 μm (determined by sieve analysis in accordance with ISO 3310-1).

Example 2B: Drying of the Graft Copolymers B by a Pneumatic Dryer

The water-moist graft copolymer (precipitated graft copolymer B-I or B-II as described above) with residual moisture content 30% by weight was dried in a pneumatic dryer with use of a nitrogen/air mixture with oxygen contents lower than 1% by volume, as carrier gas. The residence time of the graft copolymer B required to reach its final residual moisture content was typically from 5 to 10 seconds. The temperature of the carrier gas was 145° C., and the product temperature was 85° C. Residual moisture content after drying was 0.7% by weight. The material was obtained in the form of a fine-particle powder with median grain size $d_{50}$ 600 μm (determined by sieve analysis in accordance with ISO 3310-1).

Example 2C: Drying of the Graft Copolymer B in an Extruder with Simultaneous Processing to Give Molded Bodies The water-moist graft copolymer B (precipitated graft copolymer B-I or B-II as described above) with residual moisture content 30% by weight was dried as in DE-B 4402394. For this, the graft copolymer B was mechanically dewatered in a twin-screw extruder. The thermoplastic copolymer A was introduced in the form of melt into the twin-screw extruder and mixed with the graft copolymer B, whereupon the ASA molding compositions were obtained in the form of granulates after extrusion by way of a die plate and granulation. The molding composition was obtained in the form of granulate in one step, and then processed to give molded bodies. Table 2 below states the compositions of the ASA molding composition after drying in the extruder.

Example 3: Production of ASA Molding Compositions and ASA Molded Bodies

The graft copolymers B-I and B-II described above, which were worked up and dried as in examples 2A and 2B, were mixed and granulated in a ZSK 25 extruder (manufacturer: Coperion) with in each case a thermoplastic copolymer A and optionally polycarbonate component C1. Table 2 below states the proportions.

Example 4: Surface Homogeneity Testing

Plaques (75×50×2.5 mm) were produced from the granulates described above in an injection mold with polished surface at a melt temperature of 240° C. and a mold temperature of 70° C.

In order to simulate moist, warm environmental conditions, the plaques (75×50×2.5 mm) were stored at 80° C. in deionized water for 8 hours. After drying of the plaques, visible surface defects were counted by the naked eye at a viewing distance of about 30 to 40 cm, to give a number of surface defects (specks).

Four plaques per molding composition were tested. The test evaluated only the polished area. The number of surface defects on a test area totaling 150 $cm^2$ was therefore determined and stated in table 2 below.

The molding compositions F1 to F9 are molding compositions of the invention, i.e. molding compositions comprising graft copolymers B-I and/or B-II dried in the invention. The molding compositions F10 to F13 are comparative examples comprising dried graft copolymers B-I and/or B-II not of the invention.

From the test results it can be seen that the molding compositions produced by the process of the invention, and moldings produced therefrom, have a noticeably small number of surface defects (specks), and therefore better surface homogeneity after storage in a moist, warm environment, whereas a noticeably larger number of surface defects occurs in the case of the molding compositions not of the invention.

TABLE 2

Compositions and test data for molding compositions F1 to F13

| Molding composition | Drying of B | B-I % by wt. | B-II % by wt. | A-I % by wt. | A-II % by wt. | A-III % by wt. | A-IV % by wt. | C-I % by wt. | Surface defects Number |
|---|---|---|---|---|---|---|---|---|---|
| F1 | 2A | 50 | | 50 | | | | | 4 |
| F2 | Fluidized- | | 48 | 52 | | | | | 3 |
| F3 | bed dryer | 20 | 10 | 30 | | | 40 | | 0 |
| F4 | | 30 | | 70 | | | | | 1 |
| F5 | | 25 | 10 | 10 | 55 | | | | 1 |
| F6 | | 16 | 17 | | | 33 | | 34 | 0 |
| F7 | | 6 | 6 | | | 13 | | 75 | 0 |
| F8 | 2B | 50 | | 50 | | | | | 2 |
| F9 | Pneumatic dryer | | 48 | 52 | | | | | 0 |
| F10 | 2C | 50 | | 50 | | | | | >25 |
| F11 | Extruder | | 48 | 52 | | | | | >25 |
| F12 | | 20 | 10 | 30 | | | 40 | | 21 |
| F13 | | 16 | 17 | | | 33 | | 34 | 24 |

It is believed that drying in the fluidized-bed dryer or in a pneumatic dryer is particularly rapid and uniform, leading to small salt inclusions (e.g. salt crystals) which bring about few surface defects visible to the naked eye. When a fluidized-bed dryer is used, an average residence time of about 20 to 30 min has proven to be particularly advantageous. When a pneumatic dryer is used, an average residence time of about 1 to 10 seconds has proven to be particularly advantageous.

Example 5: Testing of Content of Residual Monomers

Each of the graft copolymers B-I and B-II described above (in each case produced and precipitated as in example 1) was dried for 50 min in a fluidized-bed dryer as described in example 2A; samples of the graft copolymer were taken at defined time intervals here. Headspace gas chromatography was used to determine content of acrylonitrile, styrene and ethylbenzene, with external calibration and use of para-xylene as internal standard. For this, in each case 1 g of the graft copolymer powder was dispersed by shaking in 5 g of dimethyl sulfoxide with added internal standard, and subjected to measurement by headspace gas chromatography at a sample temperature of 94° C.

The temperature of the injection needle was 98° C., and the temperature of the transfer line between the headspace autosampler and the gas chromatograph was 135° C. The headspace autosampler used was a Perkin-Elmer HS-40, and the gas chromatograph used was a Hewlett Packard 5890 Series II. The detection limit is about 10 ppm for styrene, about 3 ppm for acrylonitrile and about 6 ppm for ethylbenzene.

Table 3 below collates residual moisture content (water content) and content of residual monomers as a function of drying time. It was apparent that in particular styrene content was noticeably further reduced when drying was continued for a further 5 to 10 min after a residual moisture level of about 0.4 to 0.5% had been reached. Residual moisture content (RMC) and content of styrene (S) are moreover depicted as a function of drying time in FIGS. 1 (graft copolymer B-I) and 2 (graft copolymer B-II).

TABLE 3

Content of residual monomers

| Graft copolymer | Drying time [min] | Residual moisture content [%] | Acrylonitrile [ppm] | Styrene [ppm] | Ethylbenzene [ppm] |
|---|---|---|---|---|---|
| B-I | 0 | 31.5 | 108 | 598 | 102 |
| B-I | 15 | 7.8 | <3 | 260 | 26 |
| B-I | 20 | 0.4 | <3 | 180 | 12 |
| B-I | 25 | 0.3 | <3 | <10 | <6 |
| B-I | 30 | 0.3 | <3 | <10 | <6 |
| B-I | 35 | 0.1 | <3 | <10 | <6 |
| B-I | 40 | 0.4 | <3 | <10 | <6 |
| B-I | 49 | 0.2 | <3 | <10 | <6 |
| B-I | 50 | 0.1 | <3 | <10 | <6 |
| B-II | 0 | 35.7 | 62 | 622 | 101 |
| B-II | 15 | 8.9 | <3 | 252 | 22 |
| B-II | 20 | 0.5 | <3 | 201 | 18 |
| B-II | 25 | 0.5 | <3 | 181 | 14 |
| B-II | 30 | 0.1 | <3 | 28 | <6 |
| B-II | 35 | 0.2 | <3 | <10 | <6 |
| B-II | 40 | 0.2 | <3 | <10 | <6 |
| B-II | 49 | 0.2 | <3 | <10 | <6 |
| B-II | 50 | 0.2 | <3 | <10 | <6 |

What is claimed is:

1. A process for the production of a thermoplastic molding composition comprising:
   A: from 5 to 90% by weight of at least one thermoplastic copolymer A, produced from:
   A1: from 50 to 95% by weight, based on the copolymer A, of a monomer A1 selected from styrene, α-methylstyrene, and mixtures of styrene with at least one other monomer selected from α-methylstyrene, p-methylstyrene, and $C_1$-$C_8$-alkyl (meth)acrylate; and
   A2: from 5 to 50% by weight, based on the copolymer A, of a monomer A2 selected from acrylonitrile and mixtures of acrylonitrile with at least one other monomer selected from methacrylonitrile, acrylamide, vinyl methyl ether, anhydrides of unsaturated carboxylic acids, and imides of unsaturated carboxylic acids,
   B: from 5 to 70% by weight of at least one graft copolymer B comprising:
   B1: from 50 to 90% by weight, based on the graft copolymer B, of at least one graft base B1 which is obtained via emulsion polymerization of:
   B11: from 70 to 99.9% by weight, based on the graft base B1, of at least one $C_1$-$C_8$-alkyl (meth)acrylate, as monomer B11;
   B12: from 0.1 to 10% by weight, based on the graft base B1, of at least one polyfunctional crosslinking monomer B12; and
   B13: from 0 to 29.5% by weight, based on the graft base B1, of at least one other monomer B13 selected from styrene, α-methylstyrene, $C_1$-$C_4$-alkylstyrene, acrylonitrile, methacrylonitrile, isoprene, butadiene, chloroprene, methyl methacrylate, alkylene glycol di(meth)acrylate, and vinyl methyl ether,
   where the entirety of B11+B12+B13 provides precisely 100% by weight; and
   B2: from 10 to 50% by weight, based on the graft copolymer B, of at least one graft shell B2 which is obtained via emulsion polymerization, in the presence of the at least one graft base B1, of:
   B21: from 50 to 100% by weight, based on the graft shell B2, of a monomer B21, selected from styrene, α-methylstyrene, and mixtures of styrene with at least one other monomer selected from α-methylstyrene, p-methylstyrene, and $C_1$-$C_4$-alkyl (meth)acrylate; and
   B22: from 0 to 50% by weight, based on the graft shell B2, of a monomer B22 selected from acrylonitrile and mixtures of acrylonitrile with at least one other monomer selected from methacrylonitrile, acrylamide, vinyl methyl ether, anhydrides of unsaturated carboxylic acids, and imides of unsaturated carboxylic acids,
   where the entirety of graft base B1 and graft shell B2 provides precisely 100% by weight; and
   C: from 0 to 90% by weight of at least one other polymeric component C; and
   K: from 0 to 40% by weight of at least one other component K selected from additives and auxiliaries;
   comprising the steps of:
   a) precipitation of the at least one graft copolymer B after the emulsion polymerization procedure via addition of a precipitation solution comprising at least one salt;

b) mechanical dewatering of the precipitated graft copolymer B, where a graft copolymer B with water content smaller than or equal to 50% by weight is obtained;
c) drying of the dewatered graft copolymer B with the use of a drying gas, where the graft copolymer B is moved within the drying gas and the temperature of the drying gas is in the range from 50 to 160° C.; and
d) mixing of the thermoplastic copolymer A with the dried graft copolymer B and optionally the other polymeric component(s) C and optionally the other component(s) K,
wherein the dried graft copolymer B obtained in step c) has a water content in the range from 0.05 to 0.6% by weight and a total content of residual monomers lower than 200 ppm, based on the dried graft copolymer B,
wherein the drying of the graft copolymer in step c) is continued for a further 5 to 30 min starting at the juncture at which a water content of 2% by weight is achieved.

2. The process of claim 1, wherein the drying of the dewatered graft copolymer B in step c) uses a fluidized-bed dryer and/or a pneumatic dryer.

3. The process of claim 1, wherein the median particle diameter $d_{50}$ of the graft copolymer B is in the range from 50 to 1000 nm.

4. The process of claim 1, wherein the graft copolymer B comprises:
from 10 to 50% by weight, based on the graft copolymer B, of at least one graft shell B2 which is obtained via emulsion polymerization of:
B21: from 50 to 95% by weight, based on the graft shell B2, of the monomer B21; and
B22: from 5 to 50% by weight, based on the graft shell B2, of the monomer B22,
where the entirety of B21 and B22 provides precisely 100% by weight.

5. The process of claim 1, wherein the at least one graft copolymer B comprises:
B1: from 55 to 65% by weight, based on the graft copolymer B, of the at least one graft base B1; and
B2: from 35 to 45% by weight, based on the graft copolymer B, of at least one graft shell B2 which is obtained via emulsion polymerization, in the presence of the at least one graft base B1, of:
B21: from 65 to 80% by weight, based on the graft shell B2, of a monomer B21 selected from styrene and α-methylstyrene; and
B22: from 20 to 35% by weight, based on the graft shell B2, of a monomer B22 selected from acrylonitrile and mixtures of acrylonitrile with methacrylonitrile,
where the entirety of graft base B1 and graft shell B2 provides precisely 100% by weight.

6. The process of claim 1, wherein the at least one graft copolymer B comprises:
B1: from 50 to 70% by weight, based on the graft copolymer B, of the at least one graft base B1;
B2': from 10 to 30% by weight, based on the graft copolymer B, of at least one graft shell B2' which is obtained via emulsion polymerization, in the presence of the at least one graft base B1, of:
B21': 100% by weight, based on the graft shell B2', of a monomer B21' selected from styrene, α-methylstyrene, and mixtures of styrene with at least one other monomer selected from α-methylstyrene, p-methylstyrene, and $C_1$-$C_4$-alkyl (meth)acrylate; and B2'': from 20 to 40% by weight, based on the graft copolymer B, of at least one graft shell B2'' which is obtained via emulsion polymerization, in the presence of the graft base B1 grafted with B2', of:
B21'': from 50 to 95% by weight, based on the graft shell B2'', of a monomer B21'' selected from styrene, α-methylstyrene, and mixtures of styrene with at least one other monomer selected from α-methylstyrene, p-methylstyrene, and $C_1$-$C_4$-alkyl (meth)acrylate; and
B22'': from 5 to 50% by weight, based on the graft shell B2'', of a monomer B22'' selected from acrylonitrile and mixtures of acrylonitrile with at least one other monomer selected from methacrylonitrile, acrylamide, vinyl methyl ether, anhydrides of unsaturated carboxylic acids, and imides of unsaturated carboxylic acids.

7. The process of claim 1, wherein the drying in step c) is carried out a drying gas selected from air and/or nitrogen,
where the drying is carried out with use of a fluidized-bed dryer, and the temperature of the drying gas is in the range from 50 to 160° C.; or
where the drying is carried out with use of a pneumatic dryer, and the temperature of the drying gas is in the range from 100 to 160° C.

8. The process of claim 1, wherein the drying in step c) is carried out by a drying gas selected from air and/or nitrogen,
where the drying is carried out with use of a fluidized-bed dryer, the temperature of the drying gas is in the range from 50 to 160° C., and the average residence time of the graft copolymer B in the fluidized-bed dryer is from 1 to 60 min; or
where the drying is carried out with use of a pneumatic dryer, the temperature of the drying gas is in the range from 100 to 160° C., and the average residence time of the graft copolymer B in the pneumatic dryer is from 1 to 300 seconds.

9. The process of claim 1, wherein the drying of the graft copolymer B in step c) is carried out using a fluidized-bed dryer and/or a pneumatic dryer, wherein the water content of the graft copolymer B is lower than or equal to 50% by weight, after emulsion polymerization, precipitation, and mechanical dewatering of the graft copolymer B, in order to improve the surface quality of the thermoplastic molding composition.

10. The process of claim 9, wherein the drying of the graft copolymer B is carried out in a fluidized-bed dryer and/or a pneumatic dryer by a drying gas selected from air and/or nitrogen, and the temperature of the drying gas is in the range from 50 to 160° C.

11. The process of claim 9, wherein the improvement of the surface quality of the thermoplastic molding composition comprises reduction of the number of surface defects after storage of the molding composition at a temperature in the range from 20 to 100° C. and at a relative humidity in the range from 65 to 100% and/or direct action of liquid water at a temperature in the range from 30 to 100° C. on the surface of the molding composition.

12. The process of claim 1, wherein the drying of the graft copolymer B in step c) is carried out using a fluidized-bed dryer and/or of a pneumatic dryer, wherein the water content of the graft copolymer B is lower than or equal to 50% by weight, after emulsion polymerization, precipitation, and mechanical dewatering of the graft copolymer B, in order to reduce the total content of residual monomers in the graft copolymer B.

13. A thermoplastic molding composition obtained by the process of claim 1, wherein the thermoplastic molding composition comprises salt inclusions and where the size of at least 80% of the salt inclusions, based on the total number of salt inclusions, is smaller than 0.3 mm.

14. A molding produced from the thermoplastic molding composition of claim 13.

\* \* \* \* \*